US009003212B2

(12) United States Patent
Noro

(10) Patent No.: US 9,003,212 B2
(45) Date of Patent: Apr. 7, 2015

(54) INFORMATION PROCESSING DEVICE, NON-TRANSITORY, COMPUTER READABLE STORAGE MEDIUM, AND METHOD OF CONTROLLING INFORMATION PROCESSING DEVICE

(75) Inventor: Masaaki Noro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 13/488,729

(22) Filed: Jun. 5, 2012

(65) Prior Publication Data
US 2013/0031353 A1 Jan. 31, 2013

(30) Foreign Application Priority Data
Jul. 28, 2011 (JP) .................................. 2011-165924

(51) Int. Cl.
*G06F 1/32* (2006.01)
(52) U.S. Cl.
CPC .............. *G06F 1/324* (2013.01); *G06F 1/3212* (2013.01)
(58) Field of Classification Search
CPC ...... G06F 1/3212; G06F 1/3215; G06F 1/324
USPC .......................................... 713/300, 322, 323
See application file for complete search history.

(56) References Cited

U.S. PATENT DOCUMENTS

| 6,442,699 B1 | 8/2002 | Nakajima | |
| 6,449,724 B1 | 9/2002 | Sakagami | |
| 6,684,341 B1 | 1/2004 | Malcolm et al. | |
| 6,711,447 B1 * | 3/2004 | Saeed | 700/82 |
| 7,484,110 B2 * | 1/2009 | Stufflebeam | 713/300 |
| 7,831,842 B2 | 11/2010 | Adachi et al. | |
| 2003/0226047 A1 * | 12/2003 | Park et al. | 713/300 |
| 2004/0158748 A1 | 8/2004 | Ishibashi et al. | |
| 2005/0046390 A1 * | 3/2005 | Kimura | 320/132 |
| 2006/0212247 A1 | 9/2006 | Shimoyama et al. | |
| 2006/0253715 A1 * | 11/2006 | Ghiasi et al. | 713/300 |

(Continued)

FOREIGN PATENT DOCUMENTS

| CN | 100432943 C | 11/2008 |
| JP | 2001-202166 | 7/2001 |

(Continued)

OTHER PUBLICATIONS

Office Action mailed Feb. 2, 2015 for corresponding Chinese Patent Application No. 201210243648.2.

(Continued)

*Primary Examiner* — Vincent Tran
(74) *Attorney, Agent, or Firm* — Staas & Halsey LLP

(57) ABSTRACT

An information processing device has a storage unit configured to store correlation information in which a control rule for an operating frequency of a central processing unit of the information processing device is correlated with a combination of a state change of a first element of the information processing device, and a state of a second element of the information processing device which is different from the first element, a detecting unit configured to detect the state change of the first element, a determining unit configured to determine the state of the second element in the event that state change of the first element has been detected by the detecting unit, a searching unit configured to search for, a control rule corresponding to a combination of the state change and the state, and a control unit configured to control the operating frequency of the central processing unit.

14 Claims, 26 Drawing Sheets

(56) References Cited

U.S. PATENT DOCUMENTS

| | | | |
|---|---|---|---|
| 2007/0143763 A1* | 6/2007 | Adachi et al. | 718/104 |
| 2009/0128222 A1* | 5/2009 | Zeng et al. | 327/512 |
| 2009/0228724 A1 | 9/2009 | Chinen et al. | |
| 2009/0235108 A1* | 9/2009 | Gold et al. | 713/500 |

FOREIGN PATENT DOCUMENTS

| | | |
|---|---|---|
| JP | 2001-273057 | 10/2001 |
| JP | 2003-202935 | 7/2003 |
| JP | 2004-355599 | 12/2004 |
| JP | 2006-013756 | 1/2006 |
| JP | 3776870 | 3/2006 |
| JP | 2007-257363 | 10/2007 |
| JP | 4338842 | 7/2009 |
| JP | 2009-217631 | 9/2009 |
| JP | 2009-282998 | 12/2009 |

OTHER PUBLICATIONS

English translation of Chinese Office Action mailed Feb. 2, 2015 in corresponding Chinese Patent Application No. 201210243648.2, which was submitted Feb. 13, 2015.

Japanese Office Action mailed Jan. 27, 2015 in corresponding Japanese Patent Application No. 2011-165924.

* cited by examiner

| EVENT (STATE CHANGE) | HARDWARE STATE | | | | | STATE OF APPLICATION TO BE MONITORED | ACTION LIST | | |
|---|---|---|---|---|---|---|---|---|---|
| | LCD | REMAINING BATTERY | AVAILABILITY OF EXTERNAL POWER SUPPLY | TEMPERATURE WITHIN DEVICE | WIRELESS | | | | |
| LCD ON | ANY | ANY | ANY | ANY | ANY | ANY | PRIORITY-ON-PROCESSING ALGORITHM | OPERATING FREQUENCY UPPER LIMIT VALUE 1 | OPERATING FREQUENCY LOWER LIMIT VALUE 1 |
| LCD OFF | ANY | ANY | ANY | ANY | ANY | SLEEP | PRIORITY-ON-POWER ALGORITHM | OPERATING FREQUENCY UPPER LIMIT VALUE 2 | OPERATING FREQUENCY LOWER LIMIT VALUE 2 |
| LCD OFF | ANY | ANY | ANY | ANY | ANY | ACTIVE | PRIORITY-ON-POWER ALGORITHM | OPERATING FREQUENCY UPPER LIMIT VALUE 1 | OPERATING FREQUENCY LOWER LIMIT VALUE 1 |
| START APPLICATION TO BE MONITORED | ON | ANY | ANY | ANY | ANY | ANY | SET STATE OF APPLICATION TO BE MONITORED TO ACTIVE | | |
| STOP APPLICATION TO BE MONITORED | ON | ANY | ANY | ANY | ANY | ANY | SET STATE OF APPLICATION TO BE MONITORED TO SLEEP | | |
| START APPLICATION TO BE MONITORED | OFF | ANY | ANY | ANY | ANY | ANY | PRIORITY-ON-POWER ALGORITHM | OPERATING FREQUENCY UPPER LIMIT VALUE 1 | OPERATING FREQUENCY LOWER LIMIT VALUE 1 | SET STATE OF APPLICATION TO BE MONITORED TO ACTIVE |
| STOP APPLICATION TO BE MONITORED | OFF | ANY | ANY | ANY | ANY | ANY | PRIORITY-ON-POWER ALGORITHM | OPERATING FREQUENCY UPPER LIMIT VALUE 2 | OPERATING FREQUENCY LOWER LIMIT VALUE 2 | SET STATE OF APPLICATION TO BE MONITORED TO SLEEP |

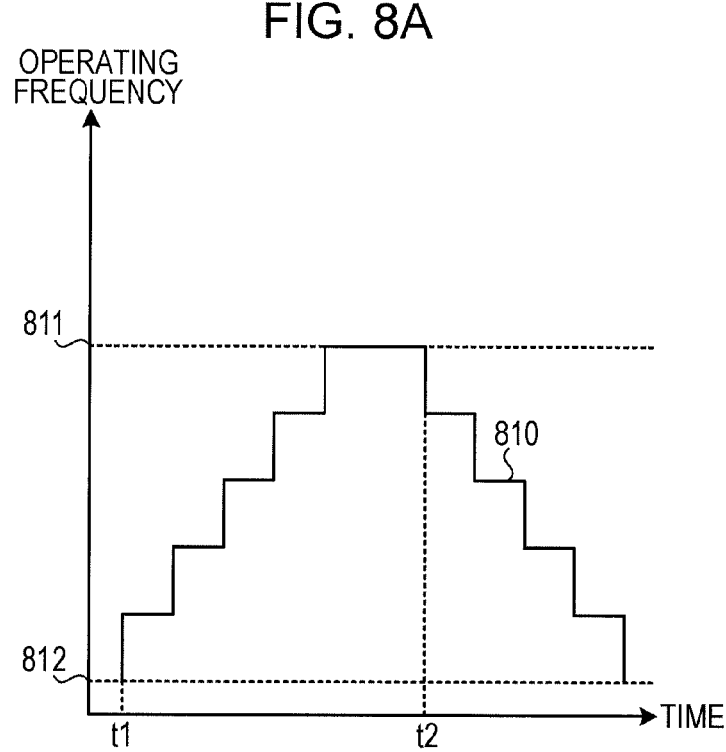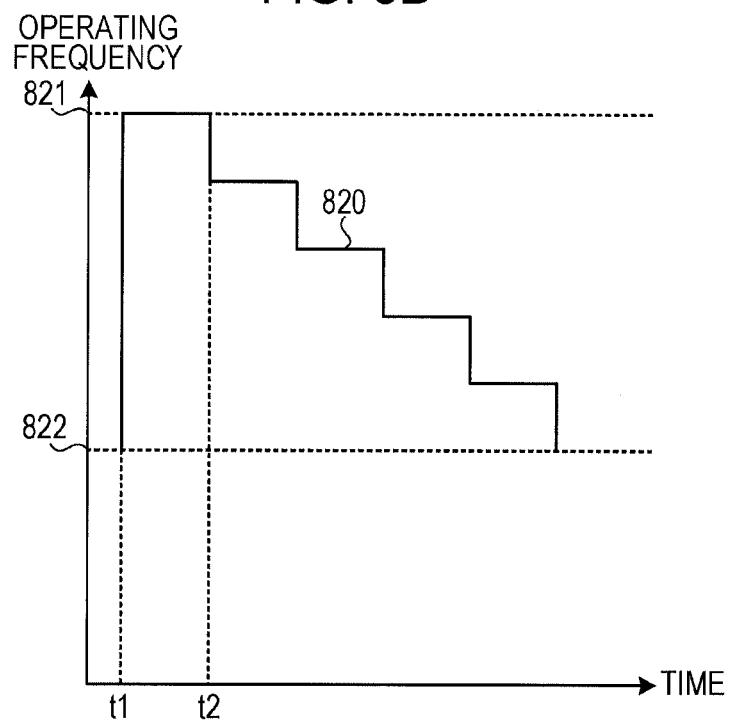

| Event (State Change) | Hardware State | | | | | State of Application to be Monitored | Operating Mode | Action List | | | |
|---|---|---|---|---|---|---|---|---|---|---|---|
| | LCD | Remaining Battery | Availability of External Power Supply | Temperature Within Device | Wireless | | | | | | |
| LCD ON | ANY | ANY | ANY | ANY | ANY | ANY | NORMAL MODE | Priority-on-processing algorithm | Operating frequency upper limit value 1 | Operating frequency lower limit value 1 | Set operating mode to normal mode |
| LCD OFF | ANY | ANY | ANY | ANY | ANY | SLEEP | POWER CONSERVING MODE | Priority-on-power algorithm | Operating frequency upper limit value 2 | Operating frequency lower limit value 2 | Set operating mode to power conserving mode |
| LCD OFF | ANY | ANY | ANY | ANY | ANY | ACTIVE | POWER CONSERVING MODE | Priority-on-power algorithm | Operating frequency upper limit value 1 | Operating frequency lower limit value 1 | Set operating mode to power conserving mode |
| LOAD CHANGE TO "HIGH" | OFF | ANY | ANY | ANY | ANY | SLEEP | POWER CONSERVING MODE | Raise operating frequency upper limit value | | | |
| LOAD CHANGE TO "LOW" | OFF | ANY | ANY | ANY | ANY | SLEEP | POWER CONSERVING MODE | Lower operating frequency upper limit value | | | |
| START APPLICATION TO BE MONITORED | ON | ANY | ANY | ANY | ANY | ANY | ANY | Set state of application to be monitored to active | | | |
| STOP APPLICATION TO BE MONITORED | ON | ANY | ANY | ANY | ANY | ANY | ANY | Set state of application to be monitored to sleep | | | |
| START APPLICATION TO BE MONITORED | OFF | ANY | ANY | ANY | ANY | ANY | POWER CONSERVING MODE | Priority-on-power algorithm | Operating frequency upper limit value 1 | Operating frequency lower limit value 1 | Set state of application to be monitored to active |
| STOP APPLICATION TO BE MONITORED | OFF | ANY | ANY | ANY | ANY | ANY | POWER CONSERVING MODE | Priority-on-power algorithm | Operating frequency upper limit value 2 | Operating frequency lower limit value 2 | Set state of application to be monitored to sleep |

FIG. 23    370

| EVENT (STATE CHANGE) | HARDWARE STATE | | | | | STATE OF APPLICATION TO BE MONITORED | OPERATING MODE | ACTION LIST | | | |
|---|---|---|---|---|---|---|---|---|---|---|---|
| | LCD | REMAINING BATTERY | AVAILABILITY OF EXTERNAL POWER SUPPLY | TEMPERATURE WITHIN DEVICE | WIRELESS | | | | | | |
| LCD ON | ANY | ANY | ANY | ANY | ANY | ANY | NORMAL MODE | PRIORITY-ON-PROCESSING ALGORITHM | OPERATING FREQUENCY UPPER LIMIT VALUE 1 | OPERATING FREQUENCY LOWER LIMIT VALUE 1 | SET OPERATING MODE TO NORMAL MODE |
| LCD OFF | ANY | ANY | ANY | ANY | ANY | SLEEP | POWER CONSERVING MODE | PRIORITY-ON-POWER ALGORITHM | OPERATING FREQUENCY UPPER LIMIT VALUE 2 | OPERATING FREQUENCY LOWER LIMIT VALUE 2 | SET OPERATING MODE TO POWER CONSERVING MODE |
| LCD OFF | ANY | ANY | ANY | ANY | ANY | ACTIVE | POWER CONSERVING MODE | PRIORITY-ON-POWER ALGORITHM | OPERATING FREQUENCY UPPER LIMIT VALUE 1 | OPERATING FREQUENCY LOWER LIMIT VALUE 1 | SET OPERATING MODE TO POWER CONSERVING MODE |
| LOAD CHANGE TO "HIGH" | OFF | ANY | ANY | ANY | ANY | SLEEP | POWER CONSERVING MODE | RAISE OPERATING FREQUENCY UPPER LIMIT VALUE | | | |
| LOAD CHANGE TO "LOW" | OFF | ANY | ANY | ANY | ANY | SLEEP | POWER CONSERVING MODE | LOWER OPERATING FREQUENCY UPPER LIMIT VALUE | | | |
| APPLICATION TO BE MONITORED "ACTIVE" | ON | ANY | ANY | ANY | ANY | ANY | ANY | SET STATE OF APPLICATION TO BE MONITORED TO ACTIVE | | | |
| APPLICATION TO BE MONITORED "SLEEP" | ON | ANY | ANY | ANY | ANY | ANY | ANY | SET STATE OF APPLICATION TO BE MONITORED TO SLEEP | | | |
| APPLICATION TO BE MONITORED "ACTIVE" | OFF | ANY | ANY | ANY | ANY | ANY | POWER CONSERVING MODE | PRIORITY-ON-POWER ALGORITHM | OPERATING FREQUENCY UPPER LIMIT VALUE 1 | OPERATING FREQUENCY LOWER LIMIT VALUE 1 | SET STATE OF APPLICATION TO BE MONITORED TO ACTIVE |
| APPLICATION TO BE MONITORED "SLEEP" | OFF | ANY | ANY | ANY | ANY | ANY | POWER CONSERVING MODE | PRIORITY-ON-POWER ALGORITHM | OPERATING FREQUENCY UPPER LIMIT VALUE 2 | OPERATING FREQUENCY LOWER LIMIT VALUE 2 | SET STATE OF APPLICATION TO BE MONITORED TO SLEEP |

INFORMATION PROCESSING DEVICE, NON-TRANSITORY, COMPUTER READABLE STORAGE MEDIUM, AND METHOD OF CONTROLLING INFORMATION PROCESSING DEVICE

CROSS-REFERENCE TO RELATED APPLICATION

This application is based upon and claims the benefit of priority of the prior Japanese Patent Application No. 2011-165924, filed on Jul. 28, 2011, the entire contents of which are incorporated herein by reference.

FIELD

The embodiments discussed herein are related to an information processing device, an information processing program, and an information processing method.

BACKGROUND

The type of operating systems conventionally used in embedded systems is single-task systems that have limited available applications, a characteristic which is not restricted to mobile terminals. There is known a technique, which uses this characteristic, in which the operating frequency of a central processing unit (CPU) that each application uses is controlled by methods that include obtaining the operating frequency by measuring, or the like, and detecting when applications start and quit. Appropriately controlling the operating frequency of the CPU enables processing capabilities to be secured and power consumption to be suppressed (for example, see Japanese Laid-open Patent Publication Nos. 2006-13756, 2004-355599, 2001-202166, and 2001-273057).

However, with operating systems for smartphones and the like, users may freely download and install various types of applications in a similar fashion as with personal computers, so it is difficult to obtain in advance the CPU operating frequency that the application desires. In the same way, with respect to a wide variety of terminals, an application developer may struggle to comprehend what level of CPU functionality an application which the developer himself/herself has created will use and may be unable to provide information for a CPU operation frequency which the application will use.

For the CPU operating frequency control architecture, for example, there is an architecture that instructs a control policy for the CPU operating frequency (that is, an algorithm for changing the CPU operating frequency, with parameters such as rate of change, upper limit/lower limit frequency, and so on) to the OS kernel. The kernel monitors the CPU usage, and determines a target CPU operating frequency based on the CPU usage and control policy. The kernel then notifies the driver of a circuit that controls the CPU voltage and clock of the determined target frequency. Based on the notification from the kernel, the driver sets the CPU frequency and voltage to a target value via procedures that are in accordance with the circuit properties.

In order to appropriately control the CPU operating frequency with such architecture, it is desirable to select the control policy in accordance with the usage purpose and state of the terminal. For example, there is a known technique in which the control policy is determined with control policies that are correlated in a one-to-one manner with events such as applications starting or stopping, a liquid crystal display turning on or off, starting/stopping of an external power supply, low battery, and so forth.

However, with the above-described related art, there is a problem that it is difficult to appropriately set the operating frequency of the CPU in accordance with the situation, since applications and hardware of multifunctional information processing devices, such as smart-phones, for example, operate under various states.

SUMMARY

According to an aspect of the invention, an information processing device has a storage unit configured to store correlation information in which a control rule for an operating frequency of a central processing unit of said information processing device is correlated with a combination of a state change of a first element of said information processing device, and a state of a second element of said information processing device which is different from said first element, a detecting unit configured to detect the state change of said first element, a determining unit configured to determine the state of said second element in the event that state change of said first element has been detected by said detecting unit, a searching unit configured to search for, from correlation information stored in said storage unit, a control rule corresponding to a combination of the state change detected by said detecting unit and the state determined by said determining unit, and a control unit configured to control the operating frequency of said central processing unit based on the control rule searched for by said searching unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a table illustrating an example of a control policy change rule table according to the first embodiment.

FIG. 8A is a diagram illustrating an example of a priority-on-power algorithm and limit values.

FIG. 8B is a diagram illustrating an example of a priority-on-processing algorithm and limit values.

FIG. 12 is a table illustrating an example of a control policy change rule table according to the second embodiment.

FIG. 23 is a table illustrating an example of a control policy change rule table according to the third embodiment.

DESCRIPTION OF EMBODIMENTS

Hereinafter, embodiments of an information processing device, information processing program, and information processing method will be described in detail with reference to the attached drawings.

Information Processing Device

Figure 1:
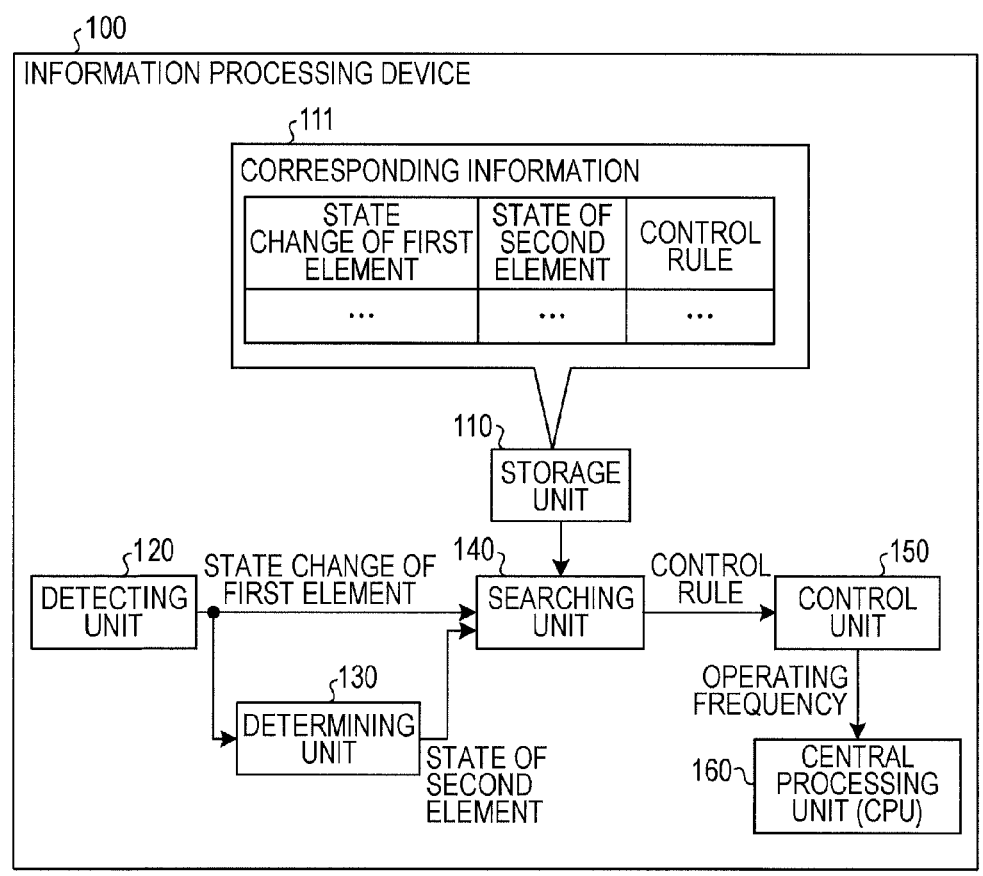
FIG. 1 is a functional block diagram of an information processing device according to an embodiment.

FIG. 1 is a functional block diagram of an information processing device according to an embodiment. As illustrated in FIG. 1, the information processing device 100 includes, for example, a storage unit 110, a detecting unit 120, a determining unit 130, a searching unit 140, a control unit 150, and a central processing unit 160.

The storage unit 110 stores corresponding information 111. The corresponding information 111 is corresponding information in which combinations of state change (that is, an event) of a first element of the information processing device 100 and a state of a second element of the information processing device 100 are correlated with control rules for the operating frequency of the central processing unit 160. The first element, second element, and control rules will be described later.

The detecting unit 120 detects state change of the first element of the information processing device 100. If the detecting unit 120 detects state change of the first element, the detecting unit 120 notifies the determining unit 130 and searching unit 140 that state change of the first element has been detected. Upon being notified from the detecting unit 120 that state change of the first element has been detected, the determining unit 130 determines the state of the second element of the information processing device 100. The determining unit 130 notifies the searching unit 140 of the state of the second element that has been determined.

The searching unit 140 searches within the corresponding information 111 stored in the storage unit 110 for a control rule corresponding to the combination of the state change of the first element notified by the detecting unit 120 and the state of the second element notified by the determining unit 130. The searching unit 140 notifies the control unit 150 of the control rule obtained by the search.

The control unit 150 controls the operating frequency of the central processing unit 160 based on the control rule notified by the searching unit 140. The central processing unit 160 is a CPU for the information processing device 100. The central processing unit 160 controls the hardware of the information processing device 100, executes software of the information processing device 100, and so on.

About the First Element

The first element of the information processing device 100 is, for example, the hardware which the information processing device 100 has. In this case, examples of a state change of the first element may include turning a liquid crystal display (LCD) on or off, starting or stopping an external power supply, remaining battery dropping below a threshold value, and so forth.

The first element may also be specific software of the information processing device 100, for example. In this case, an example of state change of the first element in this case may include starting and stopping the specific software. The specific software may be, for example, a particular application out of the applications that are installed in the information processing device 100 and are executed by the central processing unit 160.

About the Second Element

The second element of the information processing device 100 is an element of the information processing device 100 that differs from the first element. For example, the second element is the hardware which the information processing device 100 has. Examples of the state of the second element may include the on/off state of an LCD, the state of the external power supply, the state of the remaining battery, and so forth. The second element may instead be specific software of the information processing device 100. In this case, an example of the state of the second element may include whether or not the specific software is running.

Control Rules

A control rule is, for example, a control policy, such as an algorithm or parameter, or the like, that controls the operating frequency of the central processing unit 160. The processing capability and power consumption of the central processing unit 160 changes according to the control policy for the operating frequency. In addition, the control rule may be an action or the like that indicates how to change the control policy.

An example of an algorithm that controls the operating frequency is an algorithm that determines the amount to change the operating frequency of the central processing unit 160 based on conditions such as change in the load of the central processing unit 160 (for example, usage, number of applications running, and so on). Examples of a parameter for controlling the operating frequency include an upper limit or lower limit, or the like, of the operating frequency of the central processing unit 160.

For example, when a control policy that makes the operating frequency of the central processing unit 160 become relatively high is applied, the processing capabilities and power consumption of the central processing unit 160 become relatively high. On the other hand, when a control policy that makes the operating frequency of the central processing unit 160 become relatively low is applied, the processing capabilities and power consumption of the central processing unit 160 become relatively low.

Thus, with the information processing device 100, the control rules of the central processing unit 160 are controlled by referencing not just the state change of the first element but also the state of the second element. Accordingly, the processing capabilities and power consumption may be appropriately controlled in accordance with the situation when the software and hardware of the information processing device 100 operates in various states.

Hardware Configuration of Information Processing Device

Figure 2:
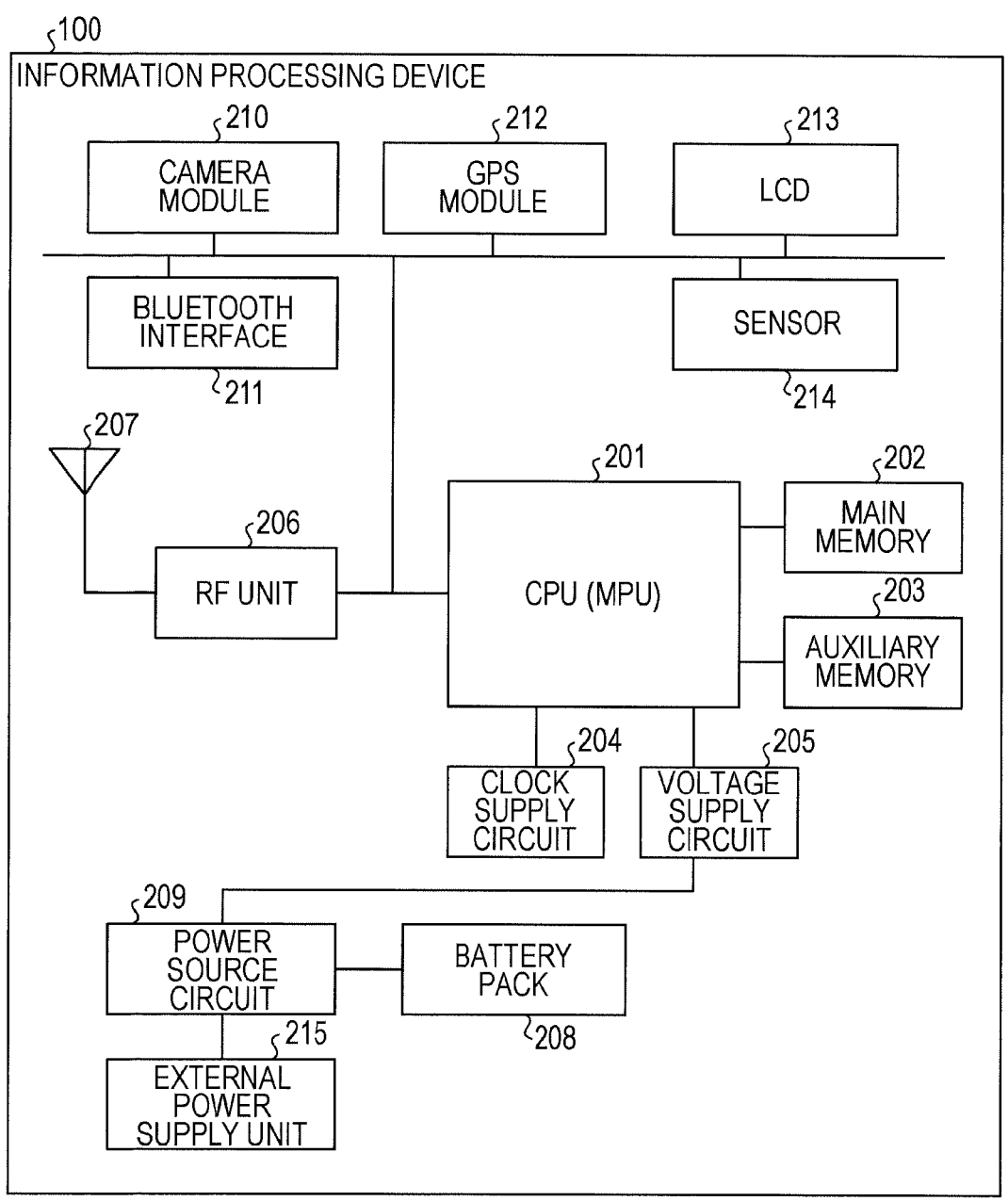
FIG. 2 is a hardware configuration diagram of the information processing device.

FIG. 2 is a hardware configuration diagram of the information processing device. The information processing device 100 illustrated in FIG. 2 is a configuration example of the information processing device 100 in FIG. 1. The information processing device 100 is, for example, a mobile information terminal, such as a smart-phone or tablet PC.

The information processing device 100 includes as hardware modules a CPU 201, main memory 202, auxiliary memory 203, a clock supply circuit 204, a voltage supply circuit 205, a radio frequency (RF) unit 206, an antenna 207, and a battery pack 208. The information processing device 100 also includes as hardware modules a power supply circuit 209, a camera module 210, a Bluetooth interface 211, a global positioning system (GPS) module 212, an LCD 213, a sensor 214, and an external power supply unit 215. The hardware modules are, for example, connected by a bus.

The CPU 201 is a configuration corresponding to the central processing unit 160 illustrated in FIG. 1. The CPU 201 governs control of the information processing device 100 in its entirety. Also, the CPU 201 operates in accordance with clock signals supplied from the clock supply circuit 204 and voltage supplied from the voltage supply circuit 205. The main memory 202 is, for example, random-access memory (RAM). The main memory 202 is used as a work area for the CPU 201.

The auxiliary memory 203 is non-volatile memory, such as a hard disk or flash memory. The auxiliary memory 203 stores various types of programs that operate the information processing device 100. The programs stored in the auxiliary memory 203 are loaded to the main memory 202 and executed by the CPU 201.

The clock supply circuit 204 supplies a clock signal, whose frequency may be changed, to the CPU 201. The clock supply circuit 204 may be realized by, for example, a device, such as a crystal oscillator that oscillates to output clock signals or a real-time clock (RTC). The voltage supply circuit 205 supplies variable voltage to the CPU 201 in accordance with the voltage supplied from the power supply circuit 209. The voltage supply circuit 205 may be realized by, for example, a voltage detector, a voltage regulator, or so forth.

The RF unit 206 has a function of serving as a transmitter to transmit radio frequency signals from the antenna 207 to other wireless communication devices, under the control of the CPU 201. The RF unit 206 also has a function of serving as a receiver to convert radio frequency signals received at the antenna 207 into baseband signals so as to be output to the CPU 201.

The battery pack 208 supplies power to the power supply circuit 209. The battery pack 208 may be realized by, for example, a battery such as a lithium ion battery, and an integrated circuit (IC) for protecting the battery, and so forth. The power supply circuit 209 supplies power supplied from the battery pack 208 to the hardware modules of the information processing device 100. If the external power supply unit 215 is connected to the power supply circuit 209, the power supply circuit 209 may supply power supplied from the external power supply unit 215 to the hardware modules of the information processing device 100. The power supply circuit 209 may be realized by, for example, a switching regulator and a voltage regulator.

The camera module 210 acquires image data, which is obtained by taking a picture of a subject, under the control of the CPU 201. The Bluetooth interface 211 is a communication interface, which performs Bluetooth (a registered trademark) wireless communication with other communication devices, under the control of the CPU 201. The information processing device 100 may also have a wireless communication interface, such as for a wireless local area network (LAN), in addition to the Bluetooth interface 211.

The GPS module 212, under the control of the CPU 201, obtains position information that indicates the current position of the information processing device 100 on the Earth, by receiving electric waves emitted from satellites.

The LCD 213 is an image display device that displays images to the user and is under control of the CPU 201. The LCD 213 may be a touch panel that also includes position input functions, such as the functionality that a touch pad or the like possesses.

The sensor 214, under the control of the CPU 201, obtains information that indicates various states within the information processing device 100. Examples of the sensor 214 include an acceleration sensor, gyro sensor, a luminance sensor, geomagnetic sensor, tilt sensor, pressure sensor, proximity sensor, temperature sensor, or the like.

First Embodiment

Configuration of Information Processing Device According to First Embodiment

Figure 3:
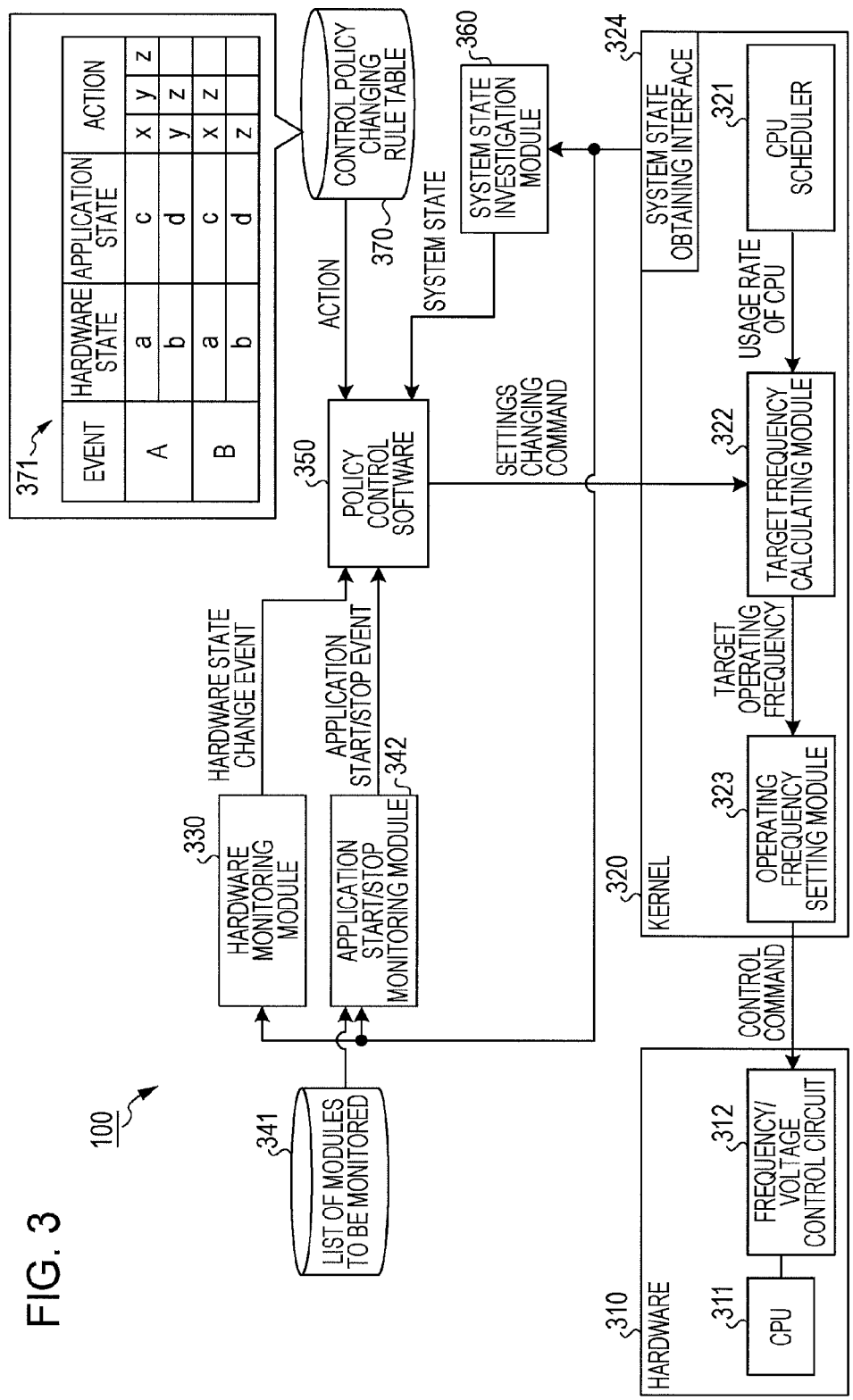
FIG. 3 is a functional block diagram of an information processing device according to a first embodiment.

FIG. 3 is a functional block diagram of an information processing device according to a first embodiment. As illustrated in FIG. 3, the hardware 310 for the information processing device 100 according to the first embodiment includes a CPU 311 and a frequency/voltage control circuit 312. The configuration of the CPU 311 corresponds to the CPU 201 illustrated in FIG. 2. The configuration of the frequency/voltage control circuit 312 corresponds to both the clock supply circuit 204 and voltage supply circuit 205 illustrated in FIG. 2.

The frequency/voltage control circuit 312 controls the CPU 311's operating frequency and the voltage supplied to the CPU 311, based on control commands output from a kernel 320. For example, the frequency/voltage control circuit 312 lowers the voltage to the CPU 311 if lowering the CPU 311's operating frequency. Also, the frequency/voltage control circuit 312 may raise the voltage to the CPU 311 if raising the CPU 311's operating frequency.

The information processing device 100 also includes the functionality of the kernel 320, a hardware monitoring module 330, a list of applications that are monitoring targets 341, an application start/stop monitoring module 342, and policy control software 350. The information processing device 100 also includes the functionality of a system state investigation module 360 and a control policy changing rule table 370. The control unit 150 illustrated in FIG. 1 may be realized by, for example, the frequency/voltage control circuit 312, kernel 320, and policy control software 350.

The kernel 320 is, for example, a part of the operating system executed by the CPU 311. The kernel 320 includes a CPU scheduler 321, a target frequency calculating module 322, an operating frequency setting module 323, and a system state obtaining interface 324.

The CPU scheduler 321 periodically obtains the usage of the CPU 311, and notifies the target frequency calculating module 322 of the usage of the CPU 311 that has been obtained. The target frequency calculating module 322 decides the target operating frequency of the CPU 311 based on the control policy for the CPU 311's operating frequency and the usage notified by the CPU scheduler 321. The target frequency calculating module 322 also changes the control policy in accordance with a settings change command output from the policy control software 350. The target frequency calculating module 322 notifies the operating frequency setting module 323 of the target operating frequency that has been decided.

The operating frequency setting module 323 is a driver which outputs a control command to the frequency/voltage control circuit 312 such that the CPU 311's operating frequency is the same as the operating frequency notified by the target frequency calculating module 322.

The hardware monitoring module 330 monitors the hardware state output from the system state obtaining interface 324, and detects change in the state of the information processing device 100's hardware. Upon detecting change in the state of the hardware, the hardware monitoring module 330 notifies the policy control software 350 with a hardware state change event, indicating that a change in the state of the hardware has been detected.

The list of applications that are monitoring targets 341 is information indicating applications to be monitored (that is, particular software) out of the applications of the information processing device 100 executed by the CPU 311. An example of an application that is a monitoring target is an application which demands a large amount of processing capability from the CPU 311, such as applications that play music or videos, applications that make phone call applications, and so on. The list of applications that are monitoring targets 341 is stored in the auxiliary memory 203 illustrated in FIG. 2, for example.

The application start/stop monitoring module 342 monitors the application/process state output from the system state obtaining interface 324, and detects starting and stopping of applications (or processes) that are included in the list of applications that are monitoring targets 341. Upon detecting starting or stopping of an application, the application start/stop monitoring module 342 notifies the policy control software 350 with an application start/stop event indicating that starting or stopping of an application has been detected. The detecting unit 120 illustrated in FIG. 1 may be realized by at least one of the hardware monitoring module 330 and application start/stop monitoring module 342.

The policy control software 350 controls the control policy for the CPU 311's operating frequency by outputting a settings change command to the target frequency calculating module 322. Specifically, upon having been notified of a hardware state change event from the hardware monitoring module 330, the policy control software 350 obtains the system state, such as the hardware state and application/process state, output from the system state obtaining interface 324. The policy control software 350 searches the control policy changing rule table 370 for an action list, using as keys the hardware state change event notified from the hardware monitoring module 330 and the system state obtained from the system state obtaining interface 324.

If notified of an application start/stop event from the application start/stop monitoring module 342, the policy control software 350 obtains the system state, such as the hardware state and application/process state, output from the system state obtaining interface 324. The policy control software 350 searches for an action list in the control policy changing rule table 370, with the application start/stop event notified from the application start/stop monitoring module 342 and the system state obtained from the system state obtaining interface 324 as keys.

The policy control software 350 notifies the kernel 320 of a settings change command that instructs that the control policy be changed, in accordance with the action list that was found. Accordingly, the control policy for the CPU 311's operating frequency is changed by the kernel 320's target frequency calculating module 322. The searching unit 140 illustrated in FIG. 1 may be realized by the policy control software 350, for example.

The system state investigation module 360 obtains the system state, such as the hardware state and application/process state, from the system state obtaining interface 324 in accordance with a request from the policy control software 350. The hardware state is information that indicates the state of the hardware of the information processing device 100. The application/process state is information that indicates whether or not a particular application or process of the information processing device 100 is running. The system state investigation module 360 outputs the obtained system information to the policy control software 350. The determining unit 130 illustrated in FIG. 1 may be realized by the system state investigation module 360, for example.

The control policy changing rule table 370 is correlation information where an action list (that is, one or more actions) is correlated with each combination of first element state change (that is, an event) and second element state. A state change for the first element includes hardware state change events, application start/stop events, and so forth. A state for the second element includes hardware states, application/process states, and so forth. Examples of an action that an action list indicates include changing an algorithm that controls the operating frequency (priority-on-processing, priority-on-power, and so on), changing parameters that control the operating frequency (proportion that the operating frequency may be changed by, upper limit and lower limit, and so on), and so forth.

The control policy changing rule table 370 is stored in the auxiliary memory 203 illustrated in FIG. 2, for example. A table 371 is a specific example of the control policy changing rule table 370. In the table 371, actions are correlated with each combination of event, which may include a hardware state change event or an application start/stop event, hardware state, and application/process state (application state).

In this way, the information processing device 100 according to the first embodiment has a system state investigation module 360 that investigates the system state when an event notification is received. The information processing device 100 then searches a multidimensional control policy changing rule table 370 with a combination of event and system state as keys, and changes the control policy based on the search results. Accordingly, the CPU 311's operating frequency may be appropriately set in accordance with the current conditions.

For example, even if an event has occurred, such as the LCD 213 being turned off or the external power supply from the external power supply unit 215 being interrupted, if a particular application is running, the upper limit of the CPU 311's operating frequency may be higher than when the particular application is not running. Thus, the responsiveness of the particular application may be improved.

In addition, the control policy changing rule table 370 stores not the control policy itself but an action for changing the control policy, whereby the number of entries (that is, the number of rules) in the control policy changing rule table 370 may be reduced. For example, actions that relate to parameters such as the upper limit or lower limit of the operating frequency may each be stored in one entry (one line), so the number of entries may be lower than when each of the current upper limits or lower limits is correlated with the upper limits or lower limits after a change.

However, a configuration may be made wherein the control policy itself is stored in the control policy changing rule table 370. If so, the CPU 311's operating frequency may be suitably set in accordance with the situation.

Control of Operating Frequency by Information Processing Device

Figure 4:
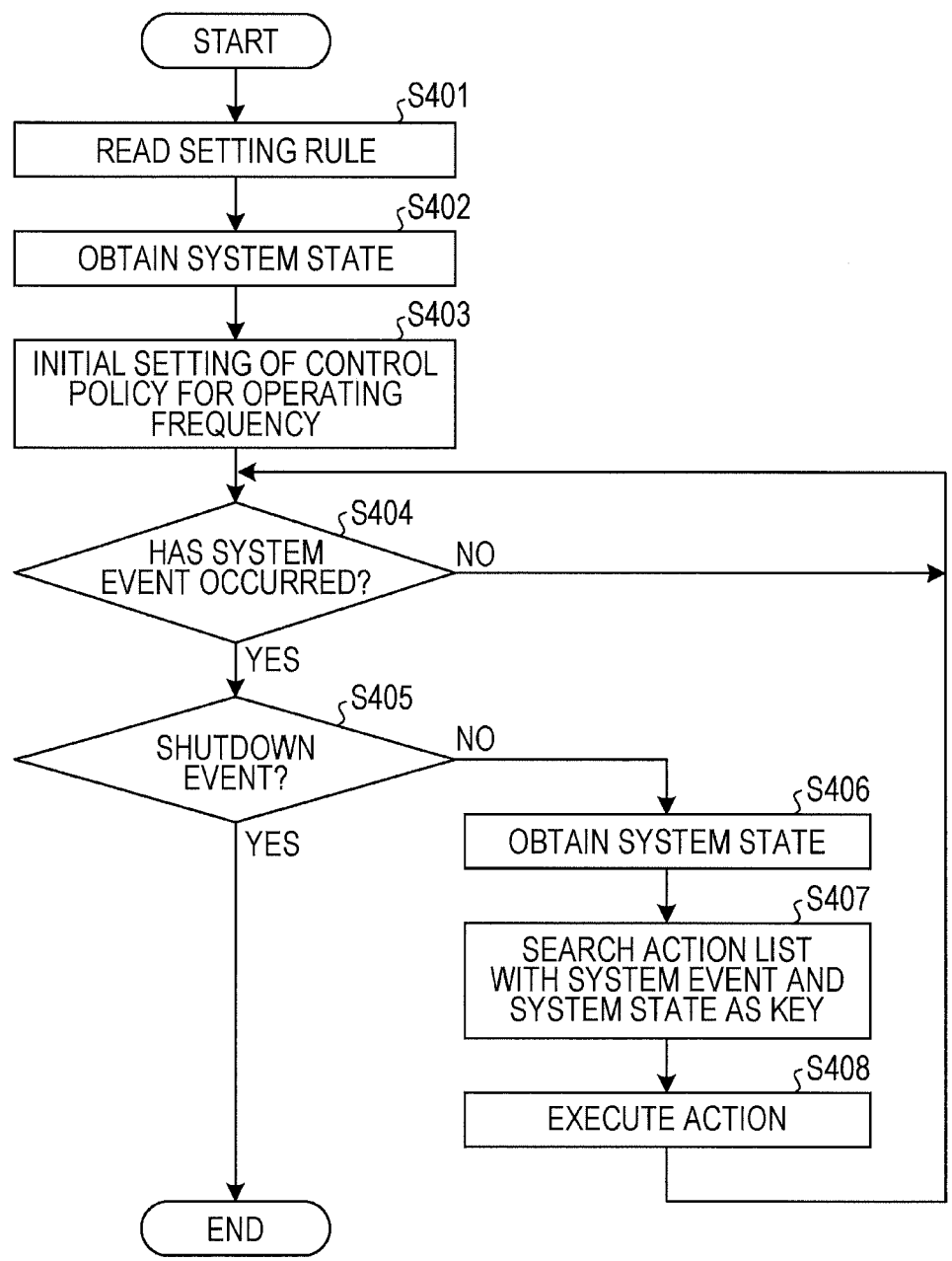
FIG. 4 is a flowchart illustrating an example of operating frequency control by the information processing device.

FIG. 4 is a flowchart illustrating an example of control of the operating frequency by the information processing device. The information processing device 100 executes the steps illustrated in FIG. 4, for example, to control the CPU 311's operating frequency. First, the information processing device 100, for example, reads in a setting rule stored in the auxiliary memory 203 (S401).

A setting rule is information that correlates the system state of the information processing device 100 and the control policy for the CPU 311's operating frequency, for example. The system state includes, for example, the state of the hardware of the information processing device 100, and the started or stopped state of applications of the information processing device 100.

Next, the information processing device 100 obtains the system state of the information processing device 100 (S402). The information processing device 100 then initializes the control policy for the CPU 311's operating frequency (S4030). Specifically, in the setting rule read in S401, the information processing device 100 sets the target frequency calculating module 322 with a control policy, which corresponds to the system state obtained in S402, as a control policy for the operating frequency of the CPU 311.

Next, the information processing device 100 determines whether or not a system event for the information processing device 100 has occurred (S404), and waits until a system event does occur (the no loop in S404). Examples of system events include an event indicating that the state of particular hardware has change to a given state, a particular application has started or stopped, or the like.

In S404, if a system event occurs (yes in S404), the information processing device 100 determines whether or not the system event which has occurred is a shutdown event for the information processing device 100 (S405). If a shutdown event has occurred (yes in S405), the information processing device 100 ends the series of control.

If the event is not a shutdown event (no in S405), the information processing device 100 obtains the system state of the information processing device 100 (S406). Next, the information processing device 100 searches for an action list from the control policy changing rule table 370, using the system event that occurred in S404 and the system state obtained in S406 as keys (S407). Next, the information processing device 100 executes actions indicated by the action list searched for in S407 (S408) and the flow returns to S404.

By performing the above S, the control policy for the CPU 311's operating frequency may be initialized based on the system state. Also, if a system event has occurred, the control policy for the CPU 311's operating frequency may be changed based on the combination of a system event that occurred and the system state when the system event occurred.

Processing by Policy Control Software

Figure 5:
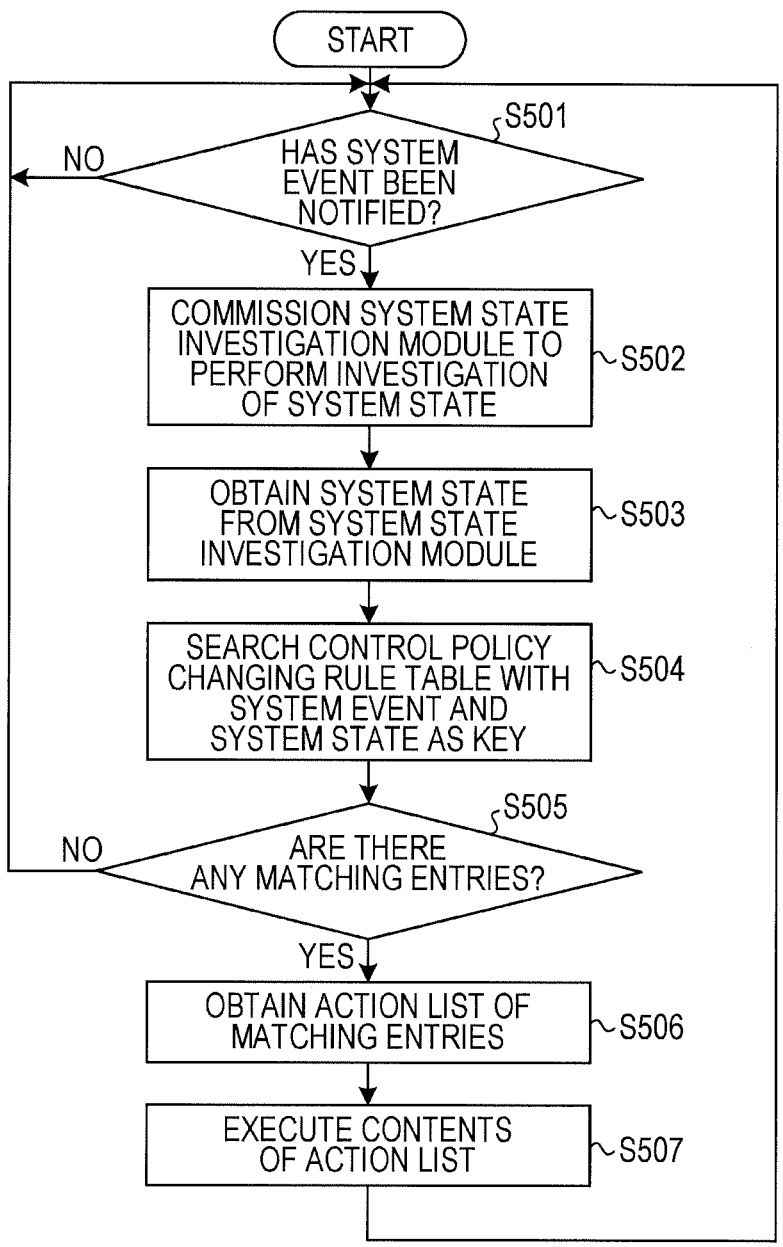
FIG. 5 is a flowchart illustrating an example of processing by policy control software.

FIG. 5 is a flowchart illustrating an example of processing with policy control software. The S illustrated in FIG. 5 are processing that correspond to S S404 and S406 through S408 in FIG. 4, for example. First, the policy control software 350 determines whether or not a system event has been notified from the hardware monitoring module 330 or the application start/stop monitoring module 342 (S501), and waits until a system event is notified (the No loop in S501).

Upon a system event being notified in S501 (yes in S501), the policy control software 350 requests the system state investigation module 360 to investigate the system state (S502). Next, the policy control software 350 obtains the system state notified from the system state investigation module 360 for the request to investigate that was made in S502 (S503).

Next, the policy control software 350 searches the control policy changing rule table 370 with a combination of the system event notified in S501 and the system state obtained in S503 as keys (S504). The policy control software 350 then determines whether or not there is an entry that matches the keys, which were used for the search in S504, in the control policy changing rule table 370 (S505).

If there is no matching entry (no in S505), the policy control software 350 returns to S501. If there is a matching entry (yes in S505), the policy control software 350 obtains an action list for the matching entry from the control policy changing rule table 370 (S506).

Next, the policy control software 350 executes the contents of the action list obtained in S506 (S507), and returns to S501. By performing the above S, the policy control software 350 may obtain the system state when a system event occurs, and may change the control policy for the CPU 311's operating frequency in accordance with a combination of the system event and the system state.

By performing the above S, when a system event occurs, the control policy for the CPU 311's operating frequency may be changed based on the combination of the system event that occurred and the system state when the system event occurred.

Processing by System State Investigation Module

Figure 6:
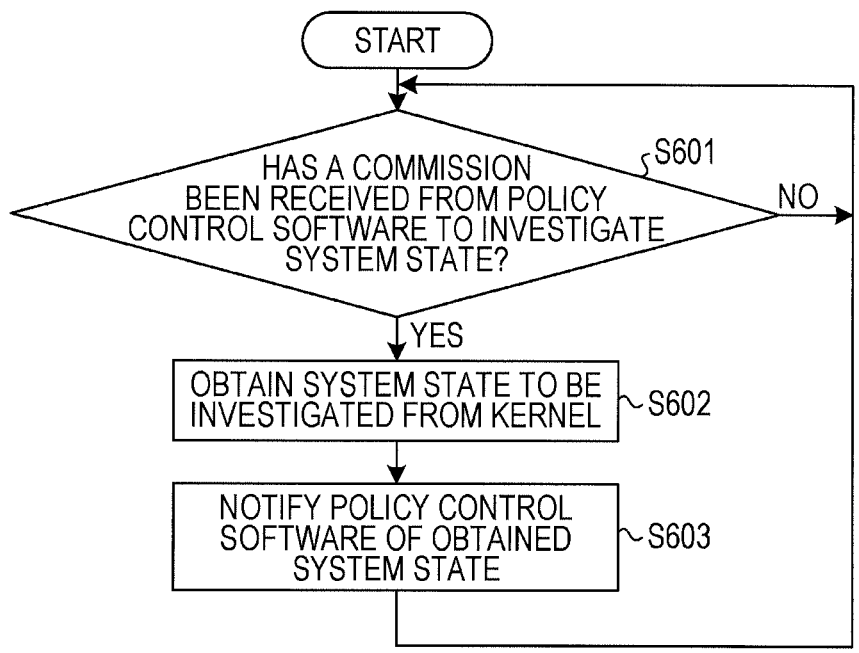
FIG. 6 is a flowchart illustrating an example of processing by a system state investigation module.

FIG. 6 is a flowchart illustrating an example of processing by the system state investigation module. The system state investigation module 360 executes the S illustrated in FIG. 6, for example. First, the system state investigation module 360 determines whether or not it has been requested by the policy control software 350 to investigate the system state (S601), and waits until an investigation is requested (the No loop in S601).

If an investigation is requested (yes in S601), the system state investigation module 360 obtains the system state to be investigated from the kernel 320 (S602). Next, the system state investigation module 360 notifies the policy control software 350 of the system state obtained in S602 (S603), and the flow returns to S601. By performing the above S, an investigation requested by the policy control software 350 for the system state may be handled by obtaining the system state to be investigated from the kernel 320 and notifying the policy control software 350 of the system state.

Control Policy Changing Rule Table According to First Embodiment

FIG. 7 is a table illustrating an example of the control policy changing rule table 370 according to the first embodiment. The control policy changing rule table 370 illustrated in FIG. 7 is an example of the control policy changing rule table 370 in FIG. 3. As illustrated in FIG. 7, an action list is correlated with combinations of "EVENT" (state change of first element), and "HARDWARE STATE" and "STATE OF APPLICATION THAT IS A MONITORING TARGET" (state of second element). "ANY" in the control policy changing rule table 370 indicates an optional state.

"LCD ON" in "EVENT" is an event indicating that the LCD 213 has been turned on from an off state. "LCD OFF" in "EVENT" is an event indicating that the LCD 213 has been turned off from an on state. "START APPLICATION THAT IS A MONITORING TARGET" in "EVENT" is an event indicating that an application that is a monitoring target has been started. "STOP APPLICATION THAT IS A MONITORING TARGET" in "EVENT" is an event indicating that an application that is a monitoring target has been stopped.

"HARDWARE STATE" indicates the state of each piece of the hardware of the information processing device 100. "LCD" indicates the on/off state of the LCD 213. "REMAINING BATTERY" indicates the remaining power in the battery pack 208. "AVAILABILITY OF EXTERNAL POWER SUPPLY" indicates whether or not power is being supplied from an external power source that is connected to the power supply circuit 209. "TEMPERATURE WITHIN DEVICE" indicates the temperature within the information processing device 100, measured by the sensor 214. "WIRELESS" indicates, for example, the on/off state of wireless functions such as the Bluetooth interface 211 and wireless LAN and so forth.

"STATE OF APPLICATION THAT IS A MONITORING TARGET" indicates whether the application that is a monitoring target is in an "ACTIVE" or "SLEEP" state. "ACTIVE" indicates that the application that is a monitoring target has been started. "SLEEP" indicates that the application that is a monitoring target has not been started.

"PRIORITY-ON-PROCESSING ALGORITHM" and "PRIORITY-ON-POWER ALGORITHM" in the action list indicate algorithms that control the CPU 311's operating frequency. "PRIORITY-ON-PERFORMANCE ALGORITHM" is an algorithm whereby the operating frequency and power consumption of the CPU 311 becomes higher than the operating frequency and power consumption of the CPU 311 for the "PRIORITY-ON-POWER ALGORITHM" (for example, see FIGS. 8A and 8B).

As illustrated in FIG. 7, if the LCD 213 is turned on, the policy control software 350 sets the control policy's algorithm to "PRIORITY-ON-PROCESSING ALGORITHM", and sets the limit values of the CPU 311's operating frequency to an "UPPER LIMIT VALUE 1" and "LOWER LIMIT VALUE 1". "UPPER LIMIT VALUE 1" is an upper limit value that is higher than a later-described "UPPER LIMIT VALUE 2". "LOWER LIMIT VALUE 1" is a lower limit value that is higher than a later-described "LOWER LIMIT VALUE 2".

If the LCD 213 is turned off, and the state of the application that is a monitoring target goes to "SLEEP", the policy control software 350 sets the control policy's algorithm to "PRIORITY-ON-POWER ALGORITHM". In addition, the policy control software 350 sets the limit values of the CPU 311's operating frequency to "UPPER LIMIT VALUE 2" and "LOWER LIMIT VALUE 2".

If the LCD 213 is turned off, and the state of the application that is a monitoring target is "ACTIVE", the policy control software 350 sets the control policy's algorithm to "PRIORITY-ON-POWER ALGORITHM". In addition, the policy control software 350 sets the limit values of the CPU 311's operating frequency to "UPPER LIMIT VALUE 1" and "LOWER LIMIT VALUE 1".

If the state of the LCD 213 is on, and the application that is a monitoring target starts, the policy control software 350 sets the "STATE OF APPLICATION THAT IS A MONITORING TARGET" to "ACTIVE". If the LCD 213 is ON, and the application that is a monitoring target stops, the policy control software 350 sets the "STATE OF APPLICATION THAT IS A MONITORING TARGET" to "SLEEP".

If the state of the LCD 213 is off, and the application that is a monitoring target starts, the policy control software 350 sets the control policy's algorithm to "PRIORITY-ON-POWER ALGORITHM". In addition, the policy control software 350 sets the limit values of the CPU 311's operating frequency to "UPPER LIMIT VALUE 1" and "LOWER LIMIT VALUE 1", and sets the "STATE OF APPLICATION THAT IS A MONITORING TARGET" to "ACTIVE".

If the state of the LCD 213 is off, and the application that is a monitoring target stops, the policy control software 350 sets the control policy's algorithm to "PRIORITY-ON-POWER ALGORITHM". In addition, the policy control software 350 sets the limit values of the CPU 311's operating frequency to "UPPER LIMIT VALUE 2" and "LOWER LIMIT VALUE 2", and sets the "STATE OF APPLICATION THAT IS A MONITORING TARGET" to "SLEEP".

Algorithms and Limit Values

FIG. 8A is a diagram illustrating an example of a priority-on-power algorithm and limit values. In FIG. 8A, the horizontal axis represents time, and the vertical axis represents the CPU 311's operating frequency. Assume that from a time t1 to a time t2, the number of applications being executed by the information processing device 100 increases, and after the timing t2 the number of applications being executed by the information processing device 100 decreases. An upper limit value 811 and lower limit value 812 represent the "UPPER LIMIT VALUE 2" and "LOWER LIMIT VALUE 2" each illustrated in FIG. 7.

In FIG. 8A, operating frequency change 810 represents the change of the CPU 311's operating frequency when using the "PRIORITY-ON-POWER ALGORITHM". As indicated by the operating frequency change 810, as the number of applications being executed by the information processing device 100 increases, the CPU 311's operating frequency increases in S in a relatively gradual manner until the upper limit value 811 is reached.

As the number of applications being executed by the information processing device 100 decreases, the CPU 311's operating frequency decreases in S in a relatively gradual manner until the lower limit value 812 is reached. Thus, the CPU 311's operating frequency becomes low overall. Accordingly, the voltage of the CPU 311 is also lower, and the power consumption of the CPU 311 may be reduced. Note that the power consumption of the CPU 311, for example, changes in proportion to the operating frequency and the square of the voltage of the CPU 311. Accordingly, the power consumption of the CPU 311 may be reduced by lowering the operating frequency and voltage of the CPU 311.

FIG. 8B is a diagram illustrating an example of a priority-on-processing algorithm and limit values. Description of the portion in FIG. 8B that is the same as that in FIG. 8A will be omitted. The upper limit value 821 and lower limit value 812 in FIG. 8B represent the "UPPER LIMIT VALUE 1" and "LOWER LIMIT VALUE 1" each illustrated in FIG. 7. Accordingly, the upper limit value 821 and lower limit value 822 are higher values than the upper limit value 811 and lower limit value 812 illustrated in FIG. 8B.

In FIG. 8B, operating frequency change 820 represents the change of the CPU 311's operating frequency when using the "PRIORITY-ON-PROCESSING ALGORITHM". As indicated by the operating frequency change 820, as the number of applications being executed by the information processing device 100 increases, the CPU 311's operating frequency sharply increases to the upper limit value 821.

As the number of applications being executed by the information processing device 100 decreases, the CPU 311's operating frequency decreases in S in a relatively gradual manner until reaching the lower limit value 822. Accordingly, the CPU 311's operating frequency is higher overall, and the processing capability of the CPU 311 may be raised. Thus, applications that have been started may be smoothly executed, and application responsiveness may be improved, for example.

Operating Frequency Control According to First Embodiment

Figure 9A:
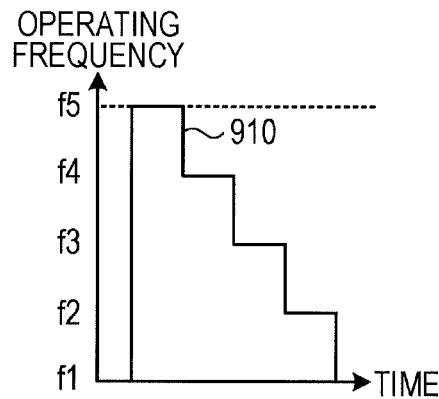
FIG. 9A is part 1 of diagrams illustrating an example of operating frequency control according to the first embodiment.
Figure 9B:
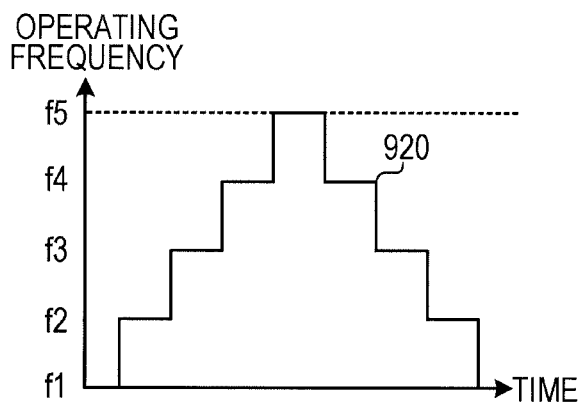
FIG. 9B is part 2 of diagrams illustrating an example of operating frequency control according to the first embodiment.
Figure 9C:
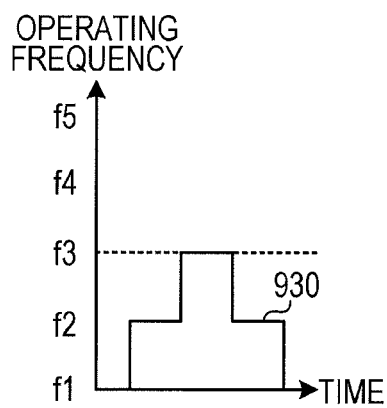
FIG. 9C is part 3 of diagrams illustrating an example of operating frequency control according to the first embodiment.

FIGS. 9A through 9C are diagrams illustrating an example of operating frequency control according to the first embodiment. In FIGS. 9A through 9C, the horizontal axis represents time, and the vertical axis represents the CPU 311's operating frequency. Assume that a frequency f5 on the vertical axis is a frequency corresponding to the "UPPER LIMIT VALUE 1" illustrated in FIG. 7, and a frequency f3 on the vertical axis is a frequency corresponding to the "UPPER LIMIT VALUE 2" illustrated in FIG. 7.

In FIG. 9A, operating frequency change 910 illustrates change of the CPU 311's operating frequency due to the control policy set for when the LCD 213 is turned on. If the LCD 213 is turned on, "PRIORITY-ON-PROCESSING ALGORITHM" and "UPPER LIMIT VALUE 1" for the operating frequency are set, as indicated in the control policy changing rule table 370 in FIG. 7. Accordingly, the upper limit value of the operating frequency goes to the frequency f5, which is relatively high, and, for example, the operating frequency steeply rises for the start of an application.

In FIG. 9B, operating frequency change 920 illustrates change of the CPU 311's operating frequency due to the control policy set for when the LCD 213 is turned off and an application that is a monitoring target is being executed. In this case, the "PRIORITY-ON-POWER ALGORITHM" and the "UPPER LIMIT VALUE 1" of the operating frequency are set, as indicated in the control policy changing rule table 370 in FIG. 7. Accordingly, the upper limit value of the operating frequency goes to the frequency f5, which is relatively high, and the operating frequency rises in a relatively gradual manner, for example, for the start of an application.

In FIG. 9C, operating frequency change 930 illustrates change of the CPU 311's operating frequency due to the control policy set for when the LCD 213 is turned off and no application that is a monitoring target is being executed. In this case, the "PRIORITY-ON-POWER ALGORITHM" and the "UPPER LIMIT VALUE 2" of the operating frequency are set, as indicated in the control policy changing rule table 370 in FIG. 7. Accordingly, the upper limit value of the operating frequency goes to the frequency f3, which is relatively low, and the operating frequency rises in a relatively gradual manner, for example, for the start of an application.

Accordingly, if an application that is a monitoring target is running at the time that the LCD 213 is turned off for example, the upper limit value of the CPU 311's operating frequency may be set higher than when an application that is a monitoring target is not running. If the application that is a monitoring target is, for example, a music player application, the upper limit value of the CPU 311's operating frequency may be set relatively high even if the LCD 213 is turned off while the player application is running. Accordingly, processing capabilities of the CPU 311 may be guaranteed for the player application, and skipping or the like may be avoided.

In this way, with the information processing device 100 according to the first embodiment, control rules for the CPU 311's operating frequency may be decided by referencing not only the state change of the first element but also the state of the second element. Accordingly, processing capabilities and power conservation may be suitably controlled in accordance with the situation even with applications and hardware operating in various states.

Specifically, in a situation where high processing capabilities are demanded of the CPU 311, a control policy may be set where the CPU 311's operating frequency is high. In addition, in a situation where high processing capabilities are not demanded of the CPU 311 or power conservation is demanded, a control policy may be set where the CPU 311's operating frequency is low.

For example, the state change of hardware when the user stops operation of the information processing device 100 (that is, an operation end state change) is the state change of the first element, and the state of whether particular software is running or not is the state of the second element. In the corresponding information, a control rule is correlated with a combination of state change when operation is ended and the state of particular software is running, such that the processing capability of the CPU 311 are higher than a combination of state change when operation is ended and the state of particular software is not running.

A state change of hardware when the user ending operations of the information processing device 100 is, for example, change of the LCD 213 from on to off, or the like. However, state change of hardware when the user ends operation of the information processing device 100 is not restricted to this, and, for example, may be change in the tilt of the information processing device 100 detected by a tilt sensor (for example, change from a tilted state to a horizontal state), or the like. Accordingly, even if the user ends operations of the information processing device 100, a control policy where the operating frequency is relatively high (meaning higher processing capability) is applied if particular software is running, whereby the particular software may be smoothly executed. For example, if the particular software is a music player or telephone call application, skipping or the like due to insufficient processing capabilities may be avoided.

An arrangement may be made wherein, with regard to the information processing device 100, stopping supply of external power, or the like, is the state change of the first element, and the state of whether particular software is running or not is the state of the second element. In the corresponding information, a control rule is correlated with a combination of stopping power supply and a state where particular software is running, such that the processing capabilities of the CPU 311 are higher than a combination of stopping power supply and a state where particular software is not running. Accordingly, even if external power supply stops, a control policy where the operating frequency is relatively high (meaning higher processing capabilities) is applied if particular software is running, and the particular software may be smoothly executed.

An arrangement may be made wherein starting particular software to be executed by the CPU 311 is the state change of the first element, and the state of whether or not the remaining battery amount of the information processing device 100 is at or above a threshold value is the state of the second element. In the corresponding information, a control rule is correlated with a combination of starting particular software and the remaining battery amount not being at or above the threshold value, such that the power consumption of the CPU 311 is lower than a combination of starting particular software and the remaining battery amount being at or above the threshold value. Accordingly, even if particular software is started, a control policy where the operating frequency is relatively low (meaning lower power consumption) may be applied so power consumption may be suppressed. For example, if an application demanding great processing capabilities of the CPU 311 is started while a priority-on-power control policy is being applied due to little battery remaining, a priority-on-processing control policy may be kept from being applied.

An arrangement may be made wherein state change of hardware when the user starts operation of the information processing device 100 (that is, operation start state change) is the state change of the first element, and the state of whether or not the remaining battery amount of the information processing device 100 is at or above a threshold value is the state of the second element. In the corresponding information, a control rule is correlated with a combination of operation start state change and the remaining battery amount not being at or above the threshold value, such that the power consumption of the CPU 311 is lower than a combination of operation start state change and the remaining battery amount not being at or above the threshold value.

This state change of hardware when the user starts operation of the information processing device 100 is, for example, change of the LCD 213 from off to on, or the like. However, state change of hardware when the user starts operation of the information processing device 100 is not restricted to this, and, for example, may be change in the tilt of the information processing device 100 detected by a tilt sensor (for example, change from a horizontal state to a tilted state) or a touch panel operation, or the like. Accordingly, for example, even if the user starts operation of the information processing device 100, a control policy where the operating frequency is relatively lower (meaning lower power consumption) is applied if the remaining battery is not at or above the threshold value, and power consumption may be suppressed.

As a hardware event for the information processing device 100, besides what has been mentioned above, on/off of GPS, on/off of wireless LAN, change of temperature within the information processing device 100, or the like, may be used. As the state of the hardware of the information processing device 100 besides the above-mentioned, the on/off state of GPS, the on/off state of wireless LAN, the temperature within the information processing device 100, or the like, may be used.

The number of entries of corresponding information (number of rules) may be reduced by having the control rules, which are correlated to the correlation information, be information that indicates change of at least one of an algorithm or parameter used to control operating frequency. Accordingly, the memory capacity used for storing the correlation information may be reduced. The burden on the system developer or user who defines the correlation information may also be alleviated.

With the information processing device 100 illustrated in FIG. 3, the configuration may be on where one of the hardware monitoring module 330 or the application start/stop monitoring module 342 is omitted. In this case, events that would be detected by the omitted module, that is, either the hardware monitoring module 330 or the application start/stop monitoring module 342, may be omitted from the control policy changing rule table 370 illustrated in FIG. 7.

Second Embodiment

Operating Frequency Control According to Second Embodiment

Figure 10:
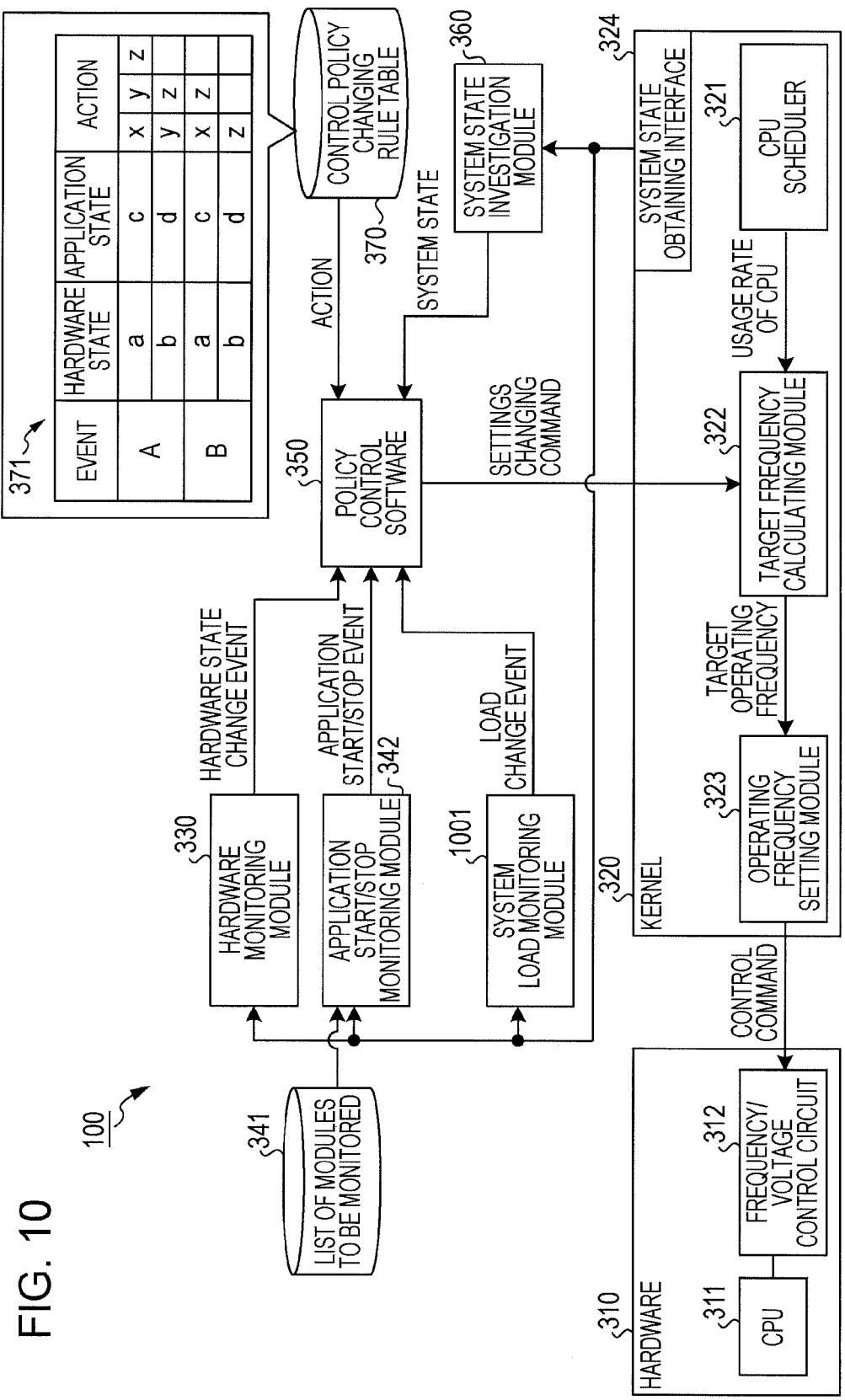
FIG. 10 is a functional block diagram of an information processing device according to a second embodiment.

FIG. 10 is a functional block diagram of an information processing device according to a second embodiment. The portions in FIG. 10 which are the same or equivalent as those illustrated in FIG. 3 are denoted with the same reference numerals and description thereof is omitted. As illustrated in FIG. 10, the information processing device 100 according to the second embodiment has, in addition to the configuration illustrated in FIG. 3, a system load monitoring module 1001.

The system load monitoring module 1001 monitors the system load from the system state obtaining interface 324. The system load is the usage of the CPU 311 (for example, proportion of time that the CPU 311 executes processing), for example. Alternatively, the system load may be the number of processes that are queued for processing by the CPU 311. If a given change in system load occurs, the system load monitoring module 1001 notifies the policy control software 350 of a load change event.

If notified of a load change event by the system load monitoring module 1001, the policy control software 350 obtains system state, such as hardware state, application/process state, or the like, which is output from the system state obtaining interface 324. The policy control software 350 searches the control policy changing rule table 370 for an action list, using the load change event notified from the system load monitoring module 1001 and the system state obtained from the system state obtaining interface 324 as keys.

Processing by System Load Monitoring Module

Figure 11:
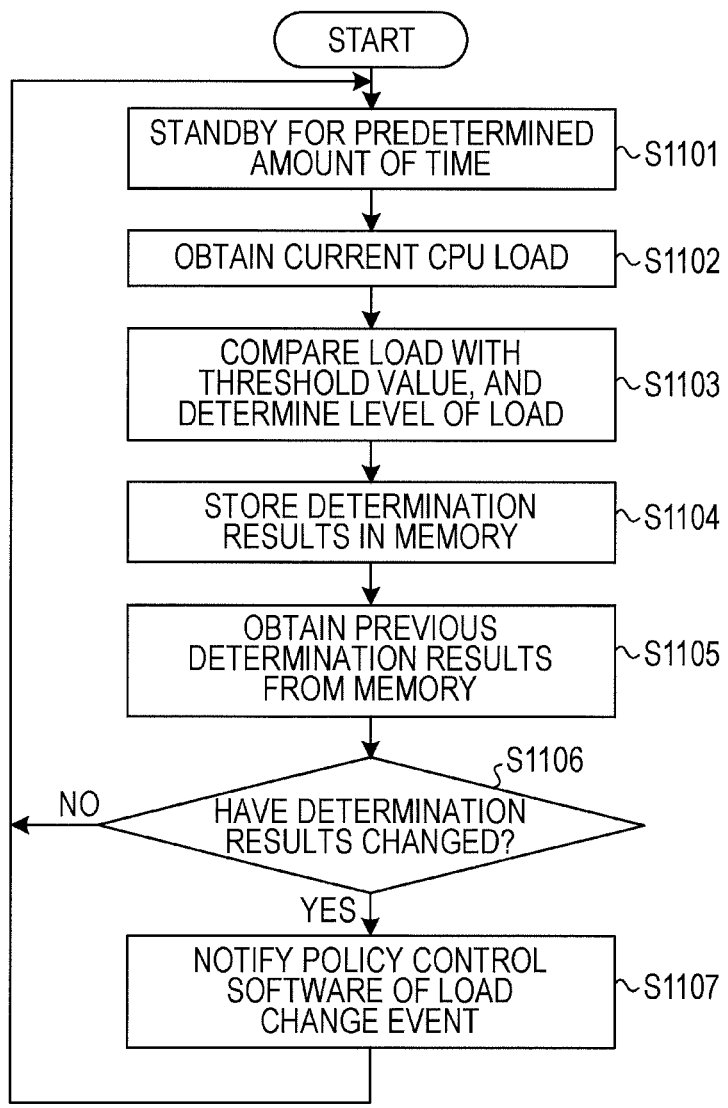
FIG. 11 is a flowchart illustrating an example of processing by a system load monitoring module.

FIG. 11 is a flowchart illustrating an example of processing by a system load monitoring module. The system load monitoring module 1001 executes the S illustrated in FIG. 11, for example. First, the system load monitoring module 1001 stands by for a given amount of time (S1101). Next, the system load monitoring module 1001 obtains the current load of the CPU 311 from the system state obtaining interface 324 (S1102).

Next, the system load monitoring module 1001 compares the load obtained in S1102 with a threshold value, and determines the magnitude of the load of the CPU 311 (S1103). Specifically, if the load is higher than a threshold, the system load monitoring module 1001 determines the load to be "high", and otherwise determines the load to be "low". Alternatively, the system load monitoring module 1001 may determine the load to be "high" if the load is higher than a first threshold, and determine the load to be "low" if the load is lower than a second threshold (where the second threshold is lower than the first threshold).

Next, the system load monitoring module 1001 stores this time's determination results from S1103 in memory (for example, auxiliary memory 203) of the information processing device 100 (S1104). Next, the system load monitoring module 1001 obtains the previous time's determination results from S1103 from memory (for example, auxiliary memory 203) of the information processing device 100 (S1105). Next, based on the previous time's determination results obtained in S1105, the system load monitoring module 1001 determines whether or not this time's determination results from S1103 have changed (S1106).

In S1106, if the determination results have not changed (no in S1106), the system load monitoring module 1001 returns the flow to S1101. If the determination results have changed (yes in S1106), the system load monitoring module 1001 advances the flow to S1107. That is, the system load monitoring module 1001 notifies the policy control software 350 of a load change event indicating that the load of the CPU 311 has changed from "low" to "high" or from "high" to "low" (S1107), and the flow returns to S1101.

The processing by the policy control software 350 is, for example, the same as with the S illustrated in FIG. 5. However, upon being notified from the system load monitoring module 1001 that the load of the CPU 311 has changed, the policy control software 350 determines in S501 that a system event has been notified, and advances to S502.

Accordingly, the control policy may be changed in accordance with the load of the CPU 311, with change in the load of the CPU 311 as a cue. Thus, for example, overload of the CPU 311 when the CPU 311's operating frequency is controlled by the "PRIORITY-ON-POWER ALGORITHM" may be avoided.

Control Policy Changing Rule Table According to Second Embodiment

FIG. 12 is a table illustrating an example of the control policy changing rule table according to the second embodiment. Description of portions in FIG. 12 that are the same as those illustrated in FIG. 7 is omitted. The control policy changing rule table 370 illustrated in FIG. 12 includes the "OPERATING MODE" of the information processing device 100 as a state of the second element. This "OPERATING MODE" includes "NORMAL MODE" and "POWER CONSERVING MODE". "POWER CONSERVING MODE" is an operating mode with less power consumption than "NORMAL MODE".

The policy control software 350 sets the "OPERATING MODE" to "NORMAL MODE" when the LCD 213 is turned on. The policy control software 350 sets the "OPERATING MODE" to "POWER CONSERVING MODE" when the LCD 213 is turned off.

If the LCD 213 is off and the "OPERATING MODE" is in the "POWER CONSERVING MODE" state, and the load of the CPU 311 changes from "LOW" to "HIGH", the policy control software 350 increases the upper limit value of the CPU 311's operating frequency. If the LCD 213 is off and the "OPERATING MODE" is in "POWER CONSERVING MODE" state, and the load of the CPU 311 changes from "HIGH" to "LOW", the policy control software 350 decreases the upper limit value of the CPU 311's operating frequency.

Accordingly, even when the mode is set to the "POWER CONSERVING MODE" in a state where the LCD 213 is off, the upper limit value of the CPU 311's operating frequency may be increased if the processing amount of the CPU 311 has increased, thereby avoiding an overload state.

Operating Frequency Control According to Second Embodiment

Figure 13A:
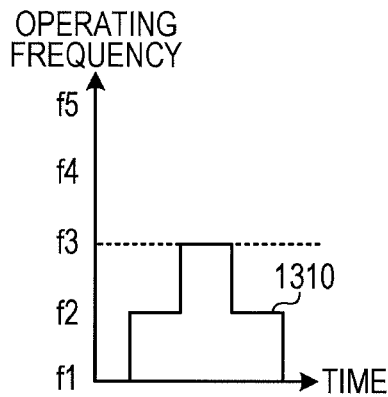
FIG. 13A is part 1 of diagrams illustrating an example of operating frequency control according to the second embodiment.
Figure 13B:
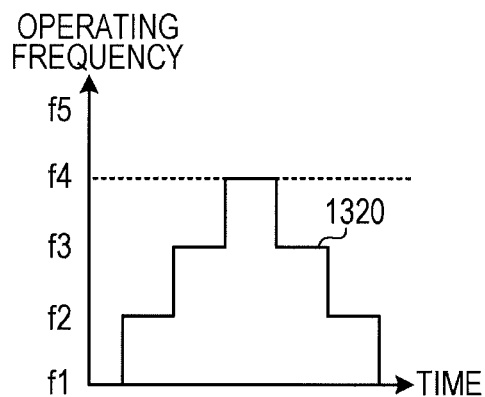
FIG. 13B is part 2 of diagrams illustrating an example of operating frequency control according to the second embodiment.
Figure 13C:
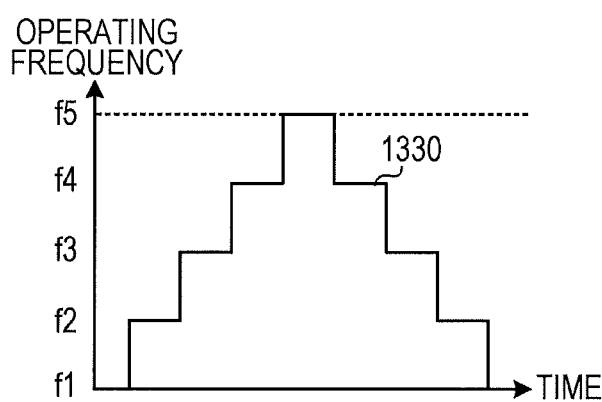
FIG. 13C is part 3 of diagrams illustrating an example of operating frequency control according to the second embodiment.

FIGS. 13A through 13C are diagrams illustrating an example of control of operating frequency according to the second embodiment. In FIGS. 13A through 13C, the horizontal axis represents time, and the vertical axis represents the CPU 311's operating frequency. In FIGS. 13A through 13C, operating frequency changes 1310, 1320, and 1330 represent change of operating frequency of the CPU 311 by control policies, whose upper limit value of operating frequency for the "PRIORITY-ON-POWER ALGORITHM" is the frequencies f3, f4, and f5, respectively.

As illustrated in control policy changing rule table 370 in FIG. 12, when the load of the CPU 311 changes from "LOW" to "HIGH", the upper limit value of the operating frequency increases. Accordingly, if the load of the CPU 311 goes from "LOW" to "HIGH" while in a state of that uses the operating frequency change 1310, transition is made to a state that uses the operating frequency change 1320. Also, if the load of the CPU 311 goes from "LOW" to "HIGH" while in a state that uses the operating frequency change 1320, transition is made to the state that uses the operating frequency change 1330.

As illustrated in control policy changing rule table 370 in FIG. 12, when the load of the CPU 311 changes from "HIGH" to "LOW", the upper limit value of the operating frequency decreases. Accordingly, if the load of the CPU 311 goes from "HIGH" to "LOW" while in a state that uses the operating frequency change 1330, transition is made to a state that uses the operating frequency change 1320. Also, if the load of the CPU 311 goes from "HIGH" to "LOW" in a state that uses the operating frequency change 1320, transition is made to the state that uses the operating frequency change 1310.

Accordingly, the upper limit value for the CPU 311's operating frequency may be changed in accordance with the load of the CPU 311, and overload of the CPU 311 may be avoided. While the upper limit value of the CPU 311's operating frequency was discussed here, the lower limit value of the CPU 311's operating frequency may be changed in accordance with the load of the CPU 311.

Modification of Processing by System Load Monitoring Module

Figure 14:
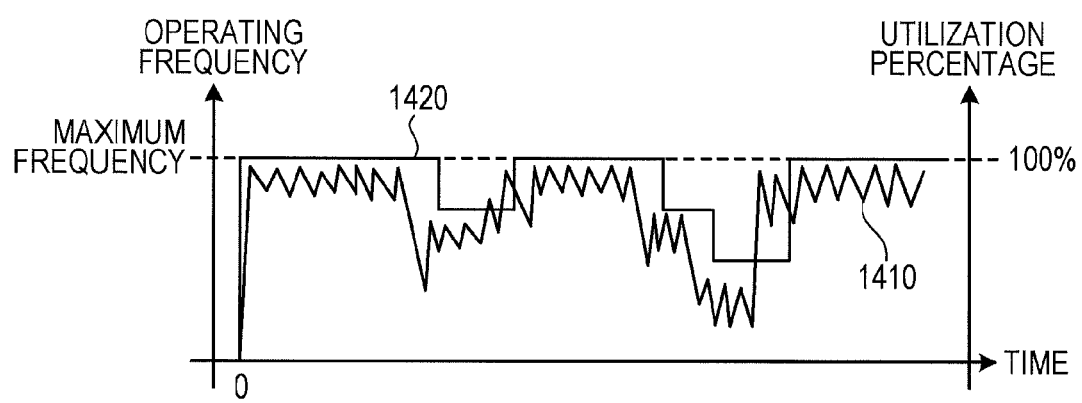
FIG. 14 is a diagram illustrating an example of the relation between CPU load and operating frequency.

FIG. 14 is a diagram illustrating an example of the relation between CPU load and operating frequency. In FIG. 14, the horizontal axis represents time, the vertical axis to the left represents the CPU 311's operating frequency, and the vertical axis to the right represents the usage (that is, load) of the CPU 311. Usage change 1410 represents change in the usage of the CPU 311 due to applications starting and stopping and the like. Operating frequency change 1420 represents change of the CPU 311's operating frequency based on the control policy.

As illustrated by the usage change 1410 and operating frequency change 1420, the CPU 311's operating frequency has a nature of changing in a manner that follows the load of the CPU 311. Using this nature, the system load monitoring module 1001 (a calculating unit) may obtain the CPU 311's operating frequency from the system state obtaining interface 324 and monitor the load of the CPU 311 based on the obtained operating frequency. Specifically, the load of the CPU 311 may be calculated by calculating the percentage of time that the CPU 311 operates at the upper limit value of the operating frequency with the current control policy.

Figure 15:
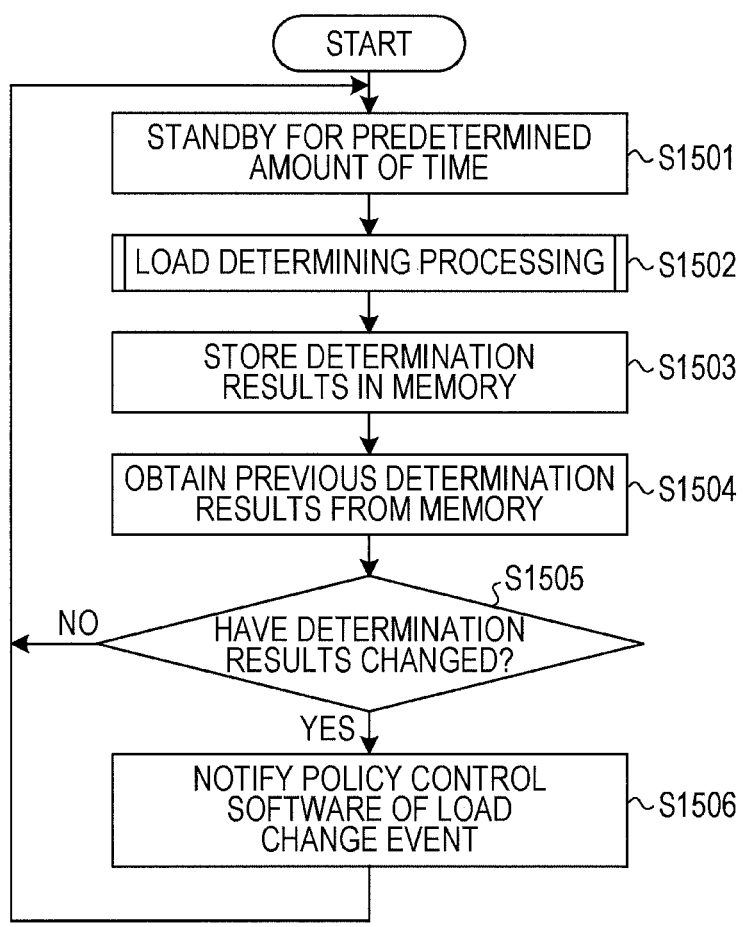
FIG. 15 is a flowchart illustrating an example of modification to processing by a system load monitoring module.

FIG. 15 is a flowchart illustrating an example of a modification of processing by system load monitoring module. The system load monitoring module 1001 may execute the S illustrated in FIG. 15, for example. First, the system load monitoring module 1001 stands by a given amount of time (S1501). Next, the system load monitoring module 1001 determines the magnitude of the load of the CPU 311 by performing load determination processing (S1502). Load determination processing will be described later. S S1503 through S1506 in FIG. 15 are the same as the S S1104 through S1107 illustrated in FIG. 11.

Figure 16:
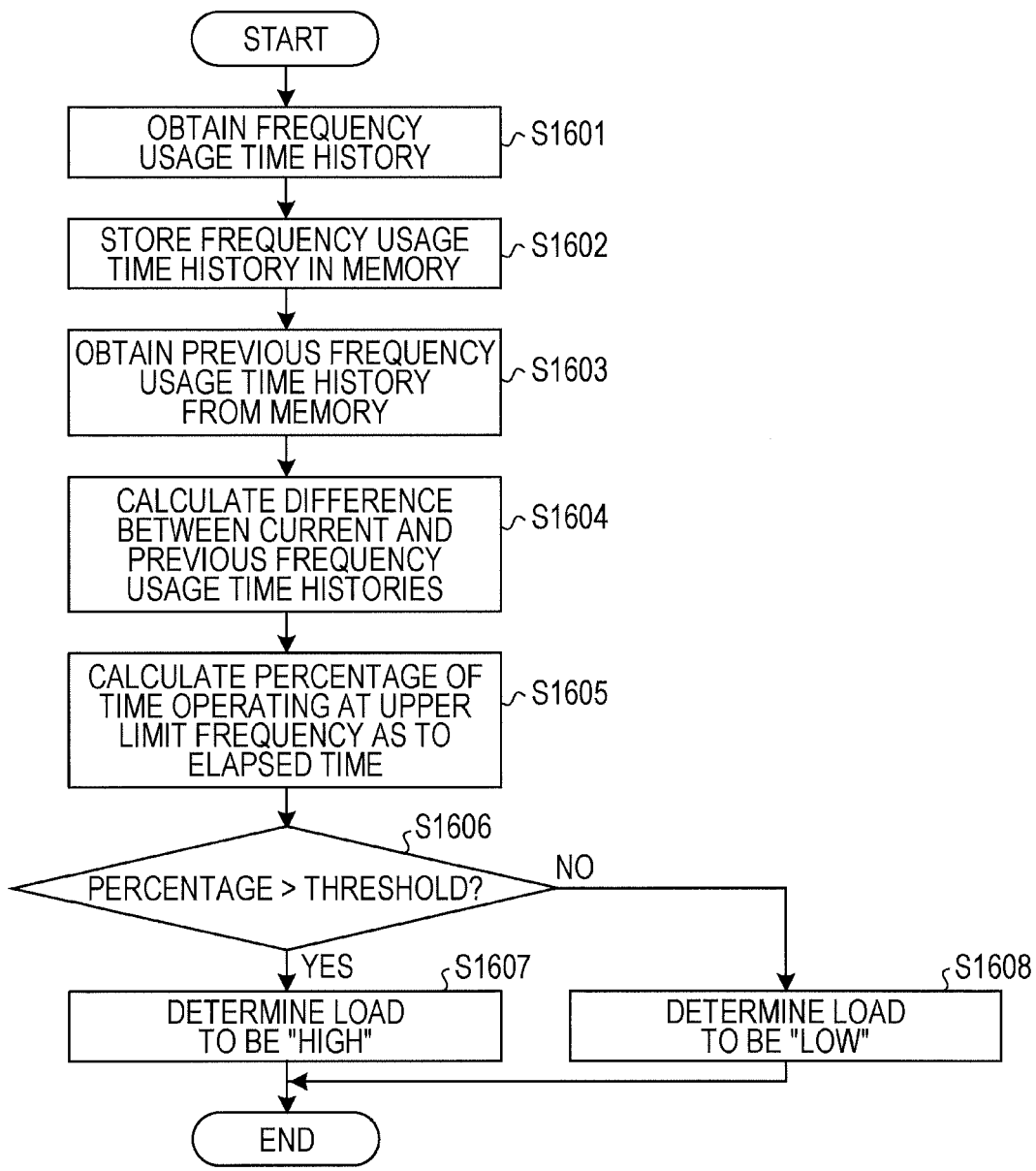
FIG. 16 is a flowchart illustrating an example of load determination processing illustrated in FIG. 15.

FIG. 16 is a flowchart illustrating an example of the load determination processing illustrated in FIG. 15. The system load monitoring module 1001, for example, executes the S illustrated in FIG. 16 in S1502 in FIG. 15. First, the system load monitoring module 1001 obtains frequency usage time history from the system state obtaining interface 324 (S1601). Frequency usage time history is, for example, information indicating the amount of time that the CPU 311 operates at each operating frequency from the time the kernel 320 starts until the current time.

Next, the system load monitoring module 1001 stores this time's frequency usage time history obtained in S1601 in memory (for example, auxiliary memory 203) of the information processing device 100 (S1602). Next, the system load monitoring module 1001 obtains the previous time's frequency usage time history obtained in S1601 from memory (for example, auxiliary memory 203) of the information processing device 100 (S1603).

Next, the system load monitoring module 1001 calculates the difference between this time's frequency usage time history obtained in S1601 and the previous time's frequency usage time history obtained in S1603 (S1604). Specifically, the system load monitoring module 1001 calculates the difference between the operating time of the CPU 311 that this time's frequency usage time history indicates and the operating time of the CPU 311 that the previous time's frequency usage time history indicates, for each operating frequency of the CPU 311. Accordingly, the operating time for each operating frequency of the CPU 311 in the time elapsed from when the previous time was checked until the current time may be calculated.

Next, the system load monitoring module 1001 calculates, out of the operating times for each operating frequency calculated in S1604, the ratio of the operating time of the CPU 311 at the upper limit value currently set to the CPU 311 compared to the time elapsed from checking the previous time until the current time (S1605). Next, the system load monitoring module 1001 determines whether or not the ratio calculated in S1605 is greater than a threshold value (S1606).

In S1606, if the calculated ratio is found to be greater than the threshold (yes in S1606), the system load monitoring module 1001 determines that the load of the CPU 311 is "HIGH" (S1607), and the series of processing ends. If the calculated ratio is found to be equal to or lower than the threshold (no in S1606), the system load monitoring module 1001 determines that the load of the CPU 311 is "LOW" (S1608), and the series of processing ends.

The magnitude of the load of the CPU 311 may be determined based on the CPU 311's operating frequency by the above S. Accordingly, a load state in line with the actual CPU 311 load may be determined.

Figure 17:
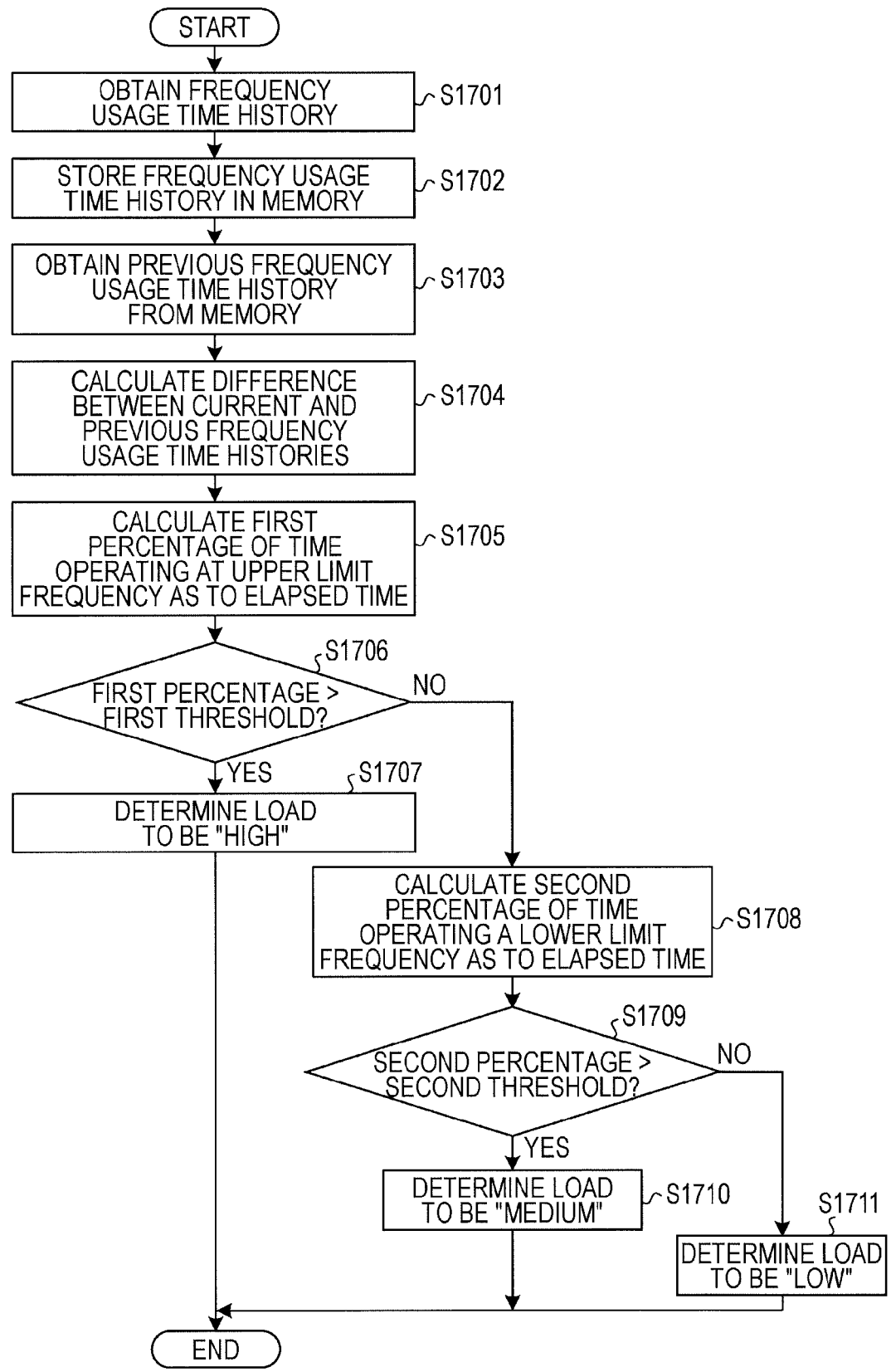
FIG. 17 is a flowchart illustrating an example of modification to the load determination processing illustrated in FIG. 16.

FIG. 17 is a flowchart illustrating an example of a modification to the load determination processing illustrated in FIG. 16. The system load monitoring module 1001, for example, may execute the S illustrated in FIG. 17 in S1502 illustrated in FIG. 15. The S S1701 through S1706 illustrated in FIG. 17 are the same as the S S1601 through S1606 illustrated in FIG. 16.

However, in S1705 the system load monitoring module 1001 calculates a first ratio with respect to the elapsed time for the operating time at the upper limit frequency (S1705). Next, the system load monitoring module 1001 determines whether or not the first ratio calculated in S1705 is greater than a first threshold value (S1706).

In S1706, if the first ratio is greater than the first threshold value (yes in S1706), the system load monitoring module 1001 determines the load of the CPU 311 to be "HIGH" (S1707), and the series of processing ends.

If the first ratio is less than or equal to the first threshold value (no in S1706), the system load monitoring module 1001 advances the flow to S1708. That is, the system load monitoring module 1001 calculates, out of the operating times for each operating frequency calculated in S1704, a second ratio of operating time of the CPU 311 at the lower limit value currently set to the CPU 311, versus the time elapsed from when the previous time was checked until the current time (S1708).

Next, the system load monitoring module 1001 determines whether or not the second ratio calculated in S1605 is greater than a second threshold value (S1709). For example, the second threshold is a value lower than the first threshold. If the second ratio is greater than the second threshold (yes in S1709), the system load monitoring module 1001 determines that the load of the CPU 311 is "MEDIUM" (S1710), and the series of processing ends.

If the second ratio is found to be less than or equal to the second threshold (no in S1709), the system load monitoring module 1001 determines that the load of the CPU 311 is "LOW" (S1711), and the series of processing ends. By performing the above S, the load of the CPU 311 may be determined to be "HIGH", "MEDIUM", or "LOW". While an example has been described here of determining the load of the CPU 311 in three stages using the first threshold and second threshold, an arrangement may be made wherein the load of the CPU 311 is determined in four or more stages using three or more threshold values.

Accordingly, with the information processing device 100 according to the second embodiment, increase of the CPU 311's load from below a threshold to greater than or equal to the threshold is taken as a state change of the first element, and if an increased load is detected, the upper limit value of the CPU 311's operating frequency may be increased. Thus, the upper limit value of the CPU 311's operating frequency may be controlled in accordance with the load of the CPU 311, and thus overload of the CPU 311 may be avoided.

Accordingly, for example, if a priority-on-power control policy is applied, and the CPU's processing capability is demanded in a large amount, the upper limit value of the CPU 311's operating frequency may be increased.

In addition, when the CPU 311's operating frequency follows the load (that is, usage) of the CPU 311, the load increase may be accurately detected by detecting increase in load based on the proportion of time that the CPU 311 has operated at the upper limit value of operating frequency within a given amount of time.

Third Embodiment

Figure 18:
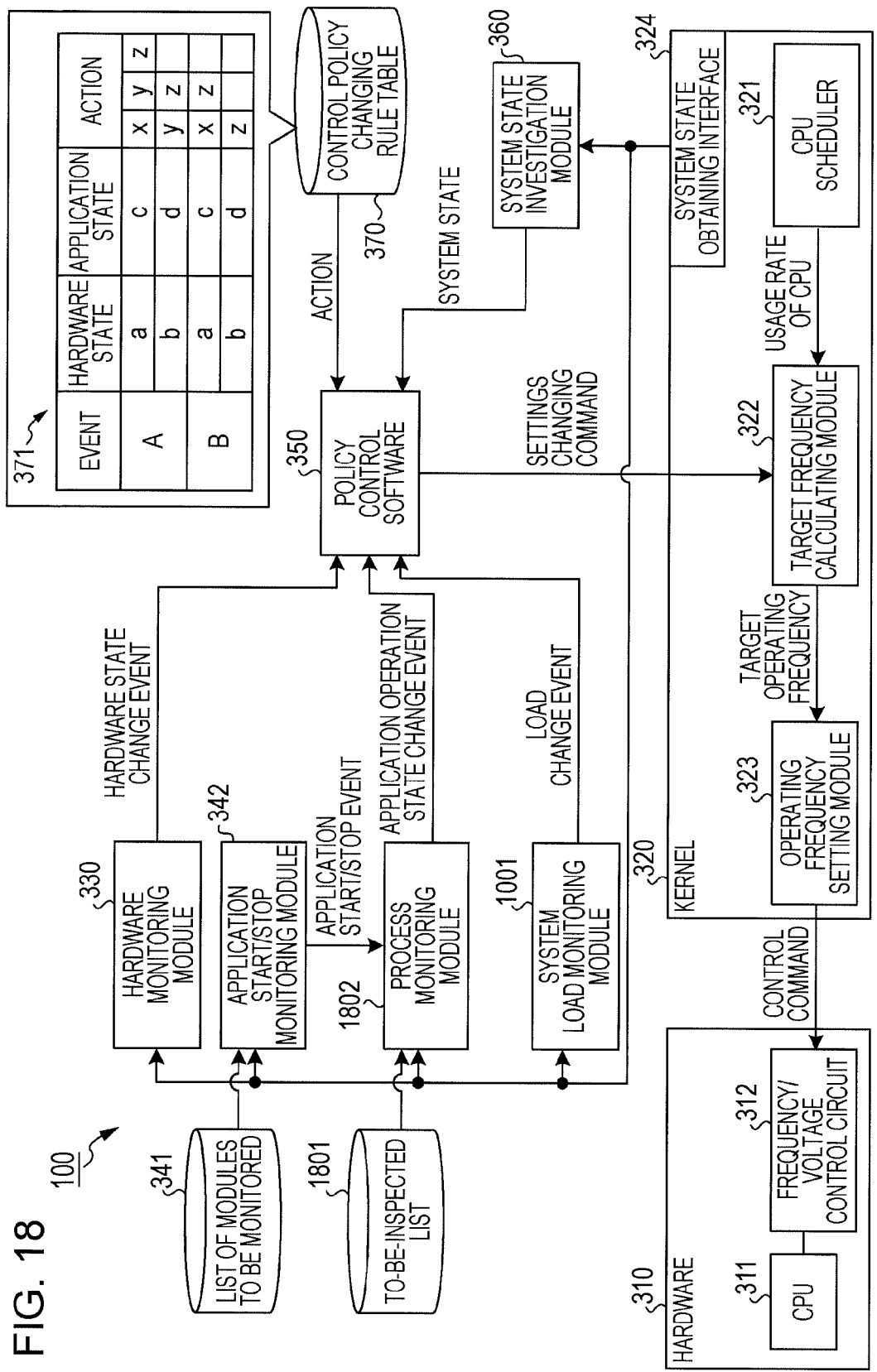
FIG. 18 is a functional block diagram of an information processing device according to a third embodiment.

FIG. 18 is a functional block diagram of an information processing device according to a third embodiment. The portions in FIG. 18 that are the same as those illustrated in FIG. 10 are denoted with the same reference numerals, and description thereof are omitted. As illustrated in FIG. 18, the information processing device 100 according to the third embodiment has, in addition to the configuration illustrated in FIG. 10, a list of inspection targets 1801 and a process monitoring module 1802. Upon detecting starting or stopping of an application, the application start/stop monitoring module 342 notifies the process monitoring module 1802 of an application start/stop event.

The list of inspection targets 1801 is information indicating, out of the list of applications that are monitoring targets 341, applications that are being inspected. The list of inspection targets 1801 is, for example, stored in the auxiliary memory 203 illustrated in FIG. 2.

Upon an application start event being notified by the application start/stop monitoring module 342, the process monitoring module 1802 adds the application that started to the list of inspection targets 1801. Upon an application stop event being notified by the application start/stop monitoring module 342, the process monitoring module 1802 deletes the application that stopped from the list of inspection targets 1801.

The process monitoring module 1802 obtains, from the system state obtaining interface 324, the usage time for the CPU 311 out of a given amount of time, for each application in the list of inspection targets 1801. The process monitoring module 1802 then determines whether or not each application in the list of inspection targets 1801 is actually being used, based on the obtained usage time. For example, the process monitoring module 1802 determines whether or not an application is actually being used based on whether or not the obtained usage time is greater than or equal to a threshold value.

If the determination result changes, the process monitoring module 1802 notifies the policy control software 350 of an application operating state change event. Thus, if the user has started using an application that is being executed, notification of an application operating state change event that indicates that use has started may be made to the policy control software 350. Also, if the user has finished using an application that is being executed, notification of an application operating state change event that indicates that use has ended may be made to the policy control software 350.

If notified of an application operating state change event by the process monitoring module 1802, the policy control software 350 obtains system state, such as hardware state and application/process state and the like, output from the system state obtaining interface 324. The policy control software 350 then searches the control policy changing rule table 370 for an action list, using both the application operating state change event notified from the process monitoring module 1802 and the system state obtained from the system state obtaining interface 324 as keys.

List of Inspection Targets

Figure 19:
FIG. 19 is a diagram illustrating an example of a for-inspection list.

FIG. 19 is a diagram illustrating an example of a list of inspection targets. The list of inspection targets 1801 illustrated in FIG. 19 is an example of the list of inspection targets 1801 illustrated in FIG. 18. The list of inspection targets 1801 includes the applications (or processes or the like) that are being executed.

Each application in the list of inspection targets 1801 has "CPU USAGE TIME" and "ACTIVITY STATE" correlated. The "CPU USAGE TIME" is information indicating the accumulated usage time of the CPU 311 by the application within a given period of time, as obtained from the system state obtaining interface 324.

"ACTIVITY STATE" is information indicating whether or not an application is actually being used. If the "ACTIVITY STATE" is "ACTIVE", this indicates that the application is actually being used. If the "ACTIVITY STATE" is "SLEEP", this indicates that the application is being run (that is, has been started but not stopped), but is not actually being used.

For example, if the "CPU USAGE TIME" is at or above a threshold value, the "ACTIVITY STATE" goes to "ACTIVE". If the "CPU USAGE TIME" is below a threshold value, the "ACTIVITY STATE" goes to "SLEEP".

Processing by Process Monitoring Module

Figure 20:
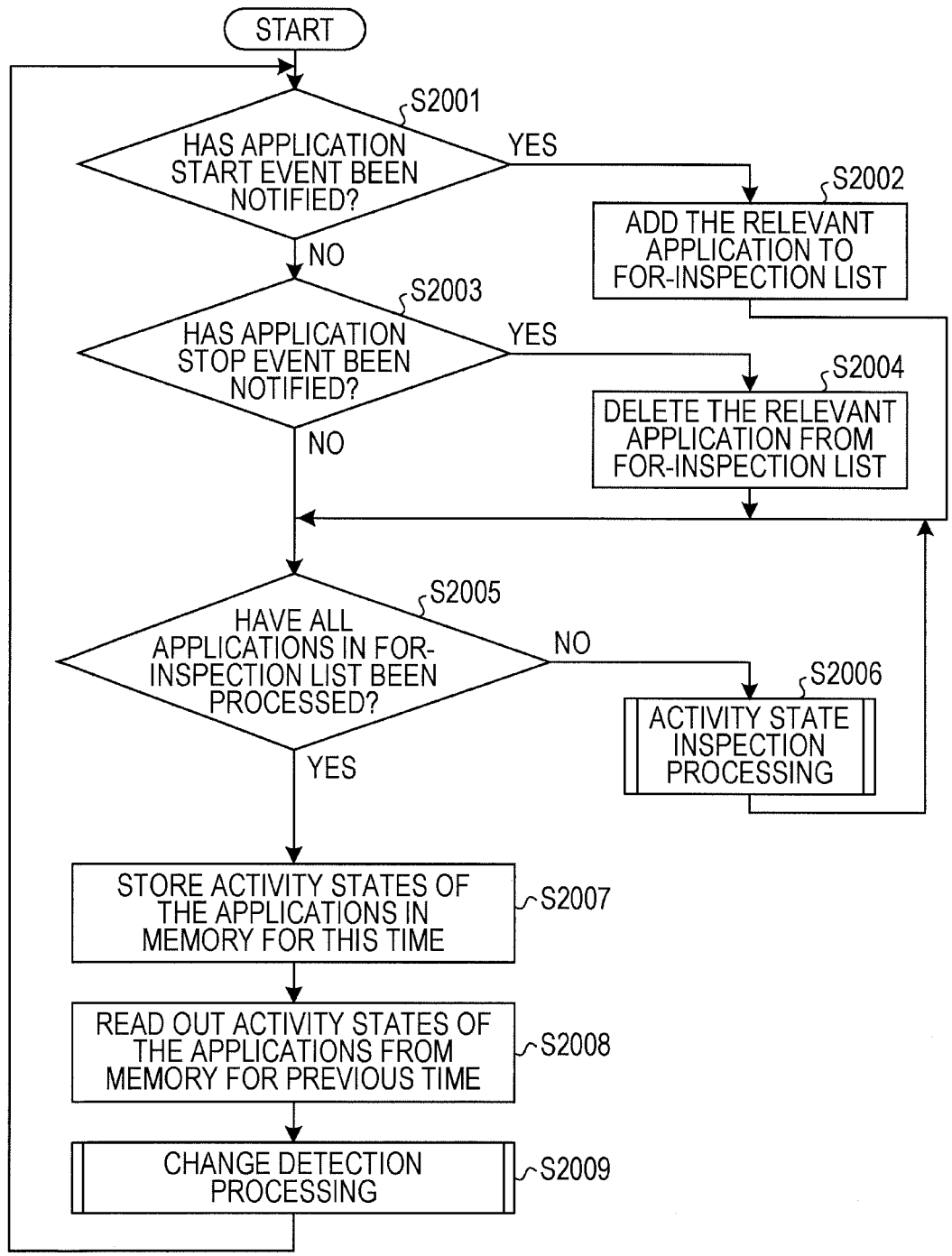
FIG. 20 is a flowchart illustrating an example of processing by a process monitoring module.

FIG. 20 is a flowchart illustrating an example of processing by a process monitoring module. The process monitoring module 1802 executes the S illustrated in FIG. 20 for example. First, the process monitoring module 1802 determines whether or not an application start event has been notified by the application start/stop monitoring module 342 (S2001).

In S2001, if an application start event has been notified (yes in S2001), the process monitoring module 1802 adds the relevant application from the application start event to the list of inspection targets 1801 (S2002), and the flow advances to S2005. If an application start event has not been notified (no in S2001), the flow proceeds to S2003. In S2003, the process monitoring module 1802 determines whether or not an application stop event has been notified by the application start/stop monitoring module 342.

In S2003, if an application stop event has been notified (yes in S2003), the process monitoring module 1802 deletes the relevant application of the application stop event from the list of inspection targets 1801 (S2004), and the flow advances to S2005. If an application stop event has not been notified (no in S2003), the flow advances to S2005. In S2005, the process monitoring module 1802 determines whether or not all applications of the list of inspection targets 1801 have been processed in S2006 (S2005).

In S2005, if not all applications of the list of inspection targets 1801 have been processed in S2006 (no in S2005), the process monitoring module 1802 advances the flow to S2006. That is, the process monitoring module 1802 performs activity state inspection processing to inspect the activity state of unprocessed applications included in the list of inspection targets 1801 (S2006). This activity state inspection processing is, for example, illustrated in FIG. 21.

In S2005, if all applications of the list of inspection targets 1801 have been processed in S2006 (yes in S2005), the process monitoring module 1802 advances the flow to S2007. That is, the process monitoring module 1802, based on the list of inspection targets 1801, stores in memory (for example, auxiliary memory 203) of the information processing device 100 the activity state of each application included in the list of inspection targets 1801 (S2007).

Next, the process monitoring module 1802 reads out the previous time's activity state for each application from memory (for example, auxiliary memory 203) of the information processing device 100 (S2008). Next, the process monitoring module 1802 performs change detection processing based on the previous time's activity state for each application that was read out in S2007 and the list of inspection targets 1801 (S2009), and the flow returns to S2001. Change detection processing is, for example, illustrated in FIG. 22.

Figure 21:
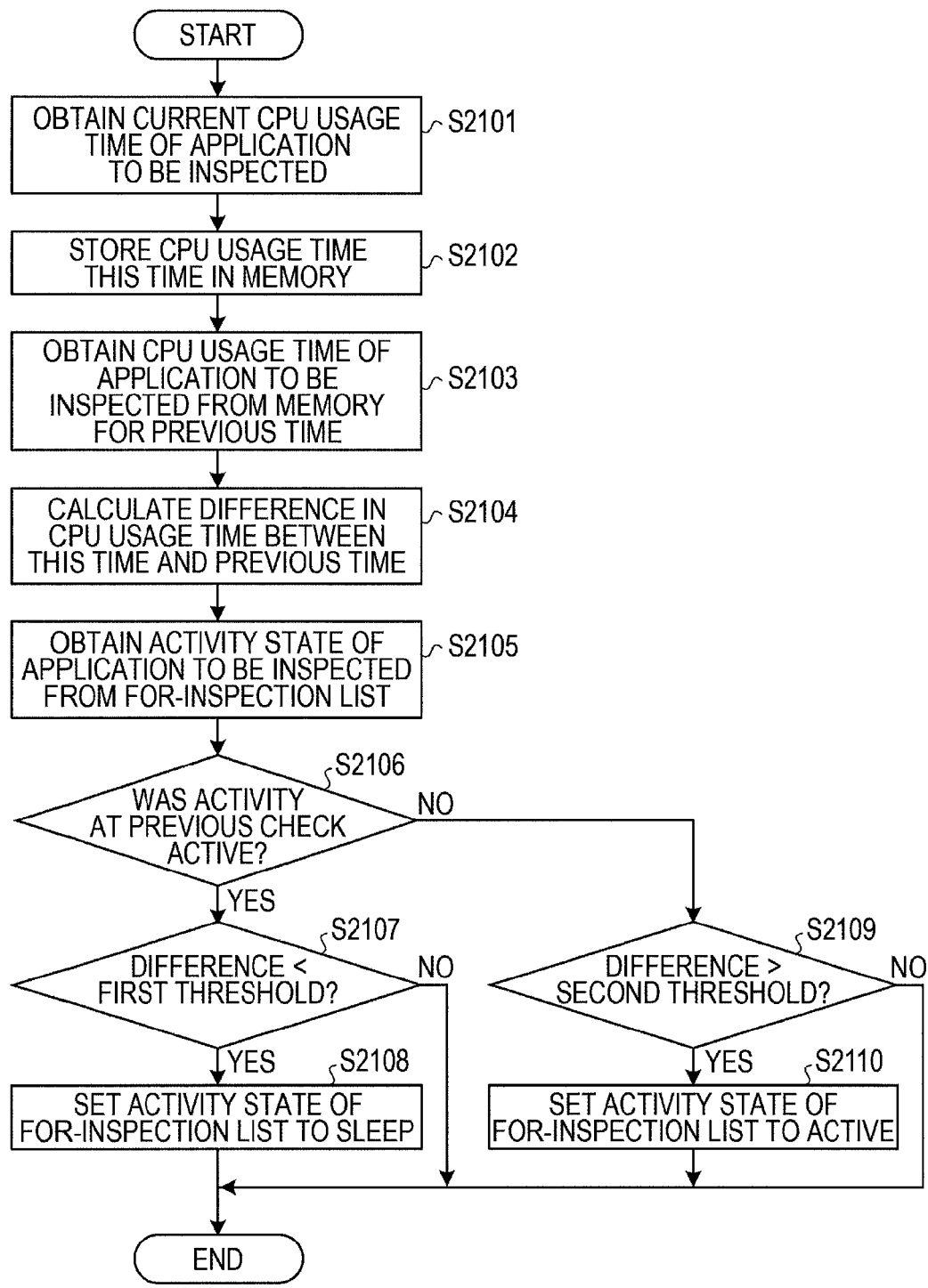
FIG. 21 is a flowchart illustrating an example of activity state inspection processing.

FIG. 21 is a flowchart illustrating an example of activity state inspection processing. The process monitoring module 1802, for example, performs the S illustrated in FIG. 21 for the applications that are inspection targets, as the activity state inspection processing in S2006 illustrated in FIG. 20. First, the process monitoring module 1802 obtains the current CPU usage time for the applications that are inspection targets from the system state obtaining interface 324 (S2101).

Next, the process monitoring module 1802 stores the CPU usage time obtained in S2101 this time in memory (for example, auxiliary memory 203) (S2102). Next, the process monitoring module 1802 obtains from memory (for example, auxiliary memory 203) the CPU usage time of the applications that are inspection targets, which was obtained the previous time. Next, the process monitoring module 1802 calculates the difference between the CPU usage time obtained this time in S2101 and the CPU usage time from the previous time obtained in S2103 (S2104).

Next, the process monitoring module 1802 obtains the activity state of the applications that are inspection targets from the list of inspection targets 1801 (S2105). Next, the process monitoring module 1802 determines whether or not the activity state at the previous time of checking, obtained in S2105, was active (S2106).

If the determination made in S2106 is that the activity state at the previous time of checking was active (yes in S2106), the process monitoring module 1802 determines whether or not the difference calculated in S2104 is smaller than a first threshold value (S2107). If the difference is smaller than the first threshold value (yes in S2107), the process monitoring module 1802 sets the activity state of the list of inspection targets 1801 to sleep (S2108), and the series of processing ends. If the difference is not smaller than the first threshold value (no in S2107), the process monitoring module 1802 ends the series of processing.

If the determination made in S2106 is that the activity state at the previous time of checking was not active but sleep (no in S2106), the process monitoring module 1802 determines whether or not the difference calculated in S2104 is greater than a second threshold value (S2109). If the difference is greater than the second threshold value (yes in S2109), the process monitoring module 1802 sets the activity state in the list of inspection targets 1801 to active (S2110), and the series of processing ends.

If the difference is less than or equal to the second threshold value (no in S2109), the process monitoring module 1802 ends the series of processing. By performing the above S, the activity state of the applications in the list of inspection targets 1801 may be inspected, and the inspection results may be reflected in the list of inspection targets 1801.

Figure 22:
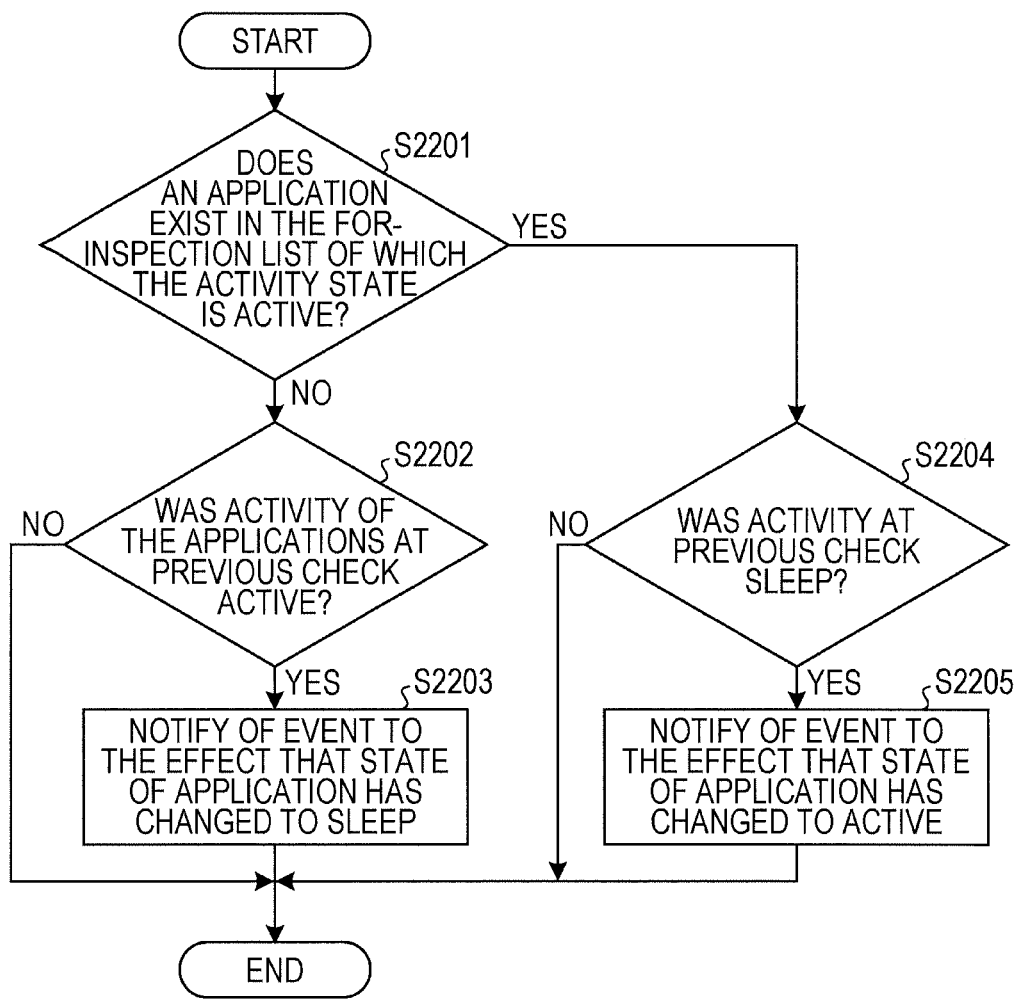
FIG. 22 is a flowchart illustrating an example of change detection processing.

FIG. 22 is a flowchart illustrating an example of change detection processing. The process monitoring module 1802, for example, executes the S illustrated in FIG. 22 as the change detecting processing in S2009 illustrated in FIG. 20. First, the process monitoring module 1802 determines whether or not an application whose activity state is active is in the list of inspection targets 1801 (S2201).

In S2201, if no application whose activity state is active is in the list of inspection targets 1801 (no in S2201), the process monitoring module 1802 advances the flow to S2202. That is, the process monitoring module 1802 determines whether or not the activity state of each of the applications obtained the previous time in S2008 is active (S2202).

In S2202, if the activity state of each of the applications obtained the previous time is sleep rather than active (no in S2202), the process monitoring module 1802 ends the series of processing. If the activity state of at least one of the applications obtained the previous time is active (yes in S2202), the process monitoring module 1802 advances the flow to S2203. That is, the process monitoring module 1802 notifies the policy control software 350 of an event (application operating state change event) that indicates that an application whose activity state the previous time was active is now sleep (S2203), and ends the series of processing.

In S2201, if an application whose activity state is active is in the list of inspection targets 1801 (yes in S2201), the process monitoring module 1802 advances the flow to S2204. That is, the process monitoring module 1802 determines whether or not the activity state of each application obtained the previous time in S2008 in FIG. 20 is sleep (S2204).

In S2204, if the activity state of each application obtained the previous time is active rather than sleep (no in S2204), the process monitoring module 1802 ends the series of processing. If the activity state of at least one of the applications obtained the previous time is sleep (yes in S2204), the process monitoring module 1802 advances the flow to S2205. That is, the process monitoring module 1802 notifies the policy control software 350 of an event (application operating state change event) that indicates that an application whose activity state the previous time was sleep is now active (S2205), and ends the series of processing.

By performing the above S, the policy control software 350 may be notified of an application operating state change event for each application in the list of inspection targets 1801 whose activity state has changed.

Control Policy Changing Rule Table According to Third Embodiment

FIG. 23 is a table illustrating an example of the control policy changing rule table according to the third embodiment. In FIG. 23, description of portions which are the same as those illustrated in FIG. 12 is omitted. The control policy changing rule table 370 illustrated in FIG. 23 has whether the state of applications to be monitored is active or sleep as an event for the control policy changing rule table 370 (that is, state change of a first element), rather than starting and stopping of applications that are monitoring targets.

If an application that is a monitoring target goes from sleep to active (that is, when usage has started) while the state of the LCD 213 is on, the policy control software 350 sets "STATE OF APPLICATION THAT IS A MONITORING TARGET" to "ACTIVE". If an application that is a monitoring target goes from active to sleep (that is, when usage has ended) in the state of the LCD 213 being on, the policy control software 350 sets "STATE OF APPLICATION THAT IS A MONITORING TARGET" to "SLEEP".

If an application that is a monitoring target goes from sleep to active (that is, when usage has started) while the state of the LCD 213 is off, the policy control software 350 sets the control policy's algorithm to "PRIORITY-ON-POWER ALGORITHM". The policy control software 350 also sets "UPPER LIMIT VALUE 1" and "LOWER LIMIT VALUE 1" as the limit values for the CPU 311's operating frequency, and sets the "STATE OF APPLICATION THAT IS A MONITORING TARGET" to "ACTIVE".

If an application that is a monitoring target goes from active to sleep (that is, usage stops) with the LCD 213 in an off state, the policy control software 350 sets the control policy's algorithm to "PRIORITY-ON-POWER ALGORITHM". The policy control software 350 also sets the "UPPER LIMIT VALUE 2" and "LOWER LIMIT VALUE 2" as the limit values for the CPU 311's operating frequency, and sets the "STATE OF APPLICATION THAT IS A MONITORING TARGET" to "SLEEP".

Thus, with the information processing device 100 according to the third embodiment, change of the first state is the change in the operating state of a particular application, whereby the control policy for the CPU 311's operating frequency may be changed in accordance with the actual usage state of the particular application. In addition, a change in the operating state of a particular application may be detected based on the usage time of the CPU 311 by the particular application.

For example, if carrying the information processing device 100 in a state that an application such as a music player has been started but is not actually being used (for example, music is not being played), a situation in which the priority-on-processing control policy continues to be applied and accordingly the power consumption increases, may be avoided.

In addition, detection processing for change in the state of the particular application may be started when the particular application starts and ended when the particular application stops. Accordingly, detection processing may be kept from being performed when the particular application is not being executed, thereby reducing the amount of processing by the information processing device 100.

A configuration may be made where the system load monitoring module 1001 is omitted from the information processing device 100 illustrated in FIG. 18. In this case, the event detected by the system load monitoring module 1001 in the control policy changing rule table 370 illustrated in FIG. 23 may be omitted.

Fourth Embodiment

Configuration of Information Processing Device According to Fourth Embodiment

Figure 24:
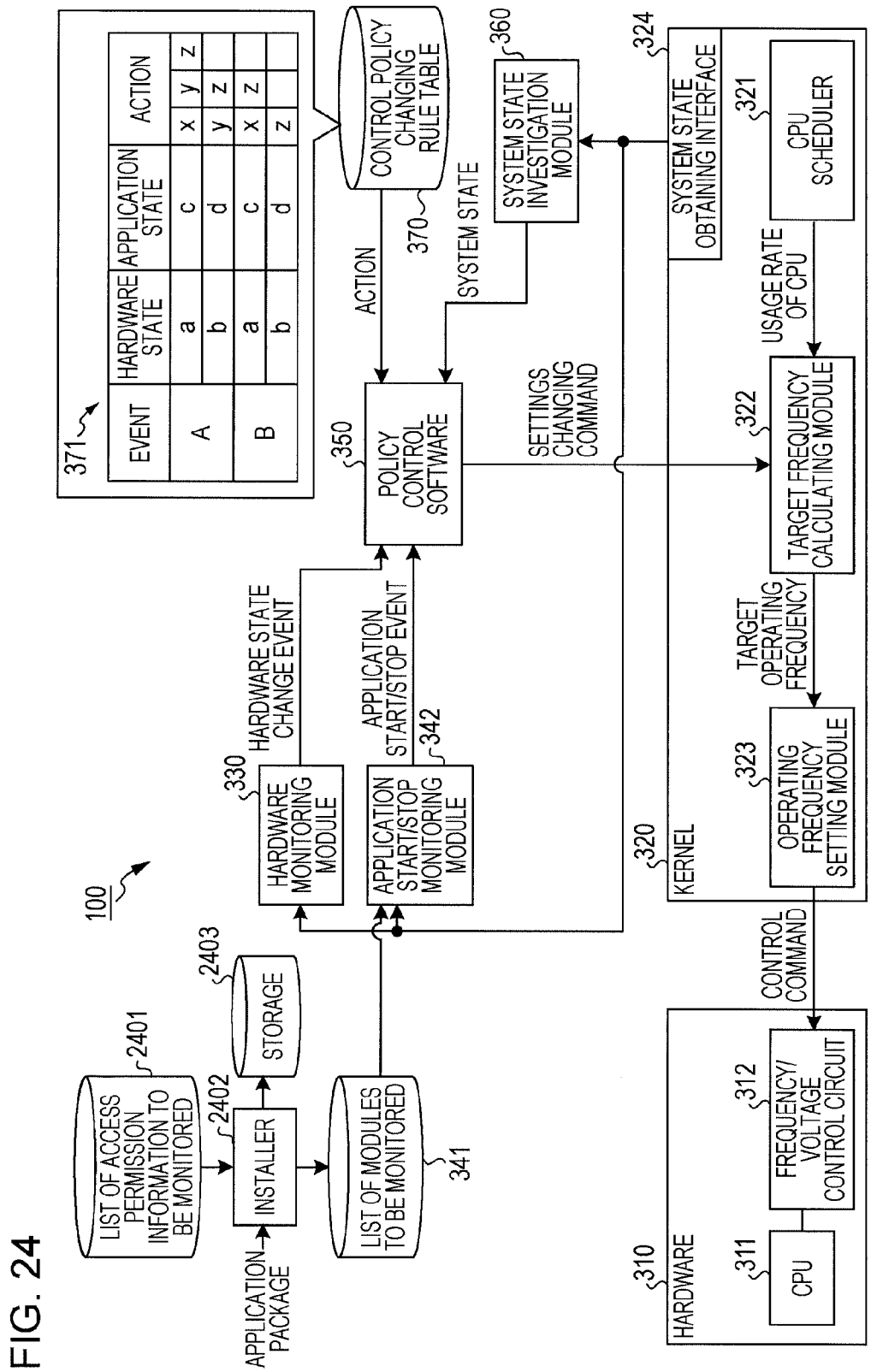
FIG. 24 is a functional block diagram of an information processing device according to a fourth embodiment.

FIG. 24 is a functional block diagram of an information processing device according to a fourth embodiment. The portions in FIG. 24 which are the same as those illustrated in FIG. 3 are denoted with the same reference numerals, and description thereof is omitted. As illustrated in FIG. 24, the information processing device 100 according to the fourth embodiment has, in addition to the configuration illustrated in FIG. 3, a list of access permission information to be monitored 2401, an installer 2402, and storage 2403.

The list of access permission information to be monitored 2401 is information indicating access permission information included in an application that is a monitoring target. Access permission information is information indicating authority (that is, permission) to indicate functions (including peripheral devices or the like) and information (that is, personal information or the like) of the information processing device 100 which the application accesses, and, for example, is stored within an application package beforehand. The list of access permission information to be monitored 2401 is, for example, stored in the auxiliary memory 203 illustrated in FIG. 2.

The application package of the application to be installed is input to the installer 2402. The installer 2402 installs the input package to the information processing device 100 by storing in the storage 2403.

The installer 2402 obtains access permission information stored in the package of the application to be installed. If the obtained access permission information is included in the list of access permission information to be monitored 2401, the installer 2402 then adds the installed application to the list of applications that are monitoring targets 341. If the obtained access permission information is not included in the list of access permission information to be monitored 2401, the installer 2402 does not add the installed application to the list of applications that are monitoring targets 341.

Accordingly, when installing an application, whether or not the application being installed is to be monitored may be determined based on access permission information, and applications to be monitored may be added to the list of applications that are monitoring targets 341. For example, access permission information included in applications that place high demands on the CPU 311's processing capability, such as applications that perform phone calls or play music or use sensors or GPS, (for example, access permission to phone call or GPS functions) is stored beforehand in the list of access permission information to be monitored 2401.

Accordingly, when installing an application that desires high processing capability, the application may be automatically added to the list of applications that are monitoring targets 341. In addition, registration of applications to the list of applications that are monitoring targets 341 is facilitated, which, for example, may alleviate user load compared to when a user performs registration manually.

The installer 2402 may have an uninstaller function to uninstall applications by deleting the applications stored in the storage 2403. When uninstalling an application included in the list of applications that are monitoring targets 341, the installer 2402 deletes the application to be uninstalled from the list of applications that are monitoring targets 341.

Accordingly, a situation may be avoided where the application start/stop monitoring module 342 continues to monitor applications that have been uninstalled. In addition, deletion of applications from the list of applications that are monitoring targets 341 is facilitated, which may alleviate user load as compared to when a user performs deletion manually, for example.

Processing by Installer

Figure 25:
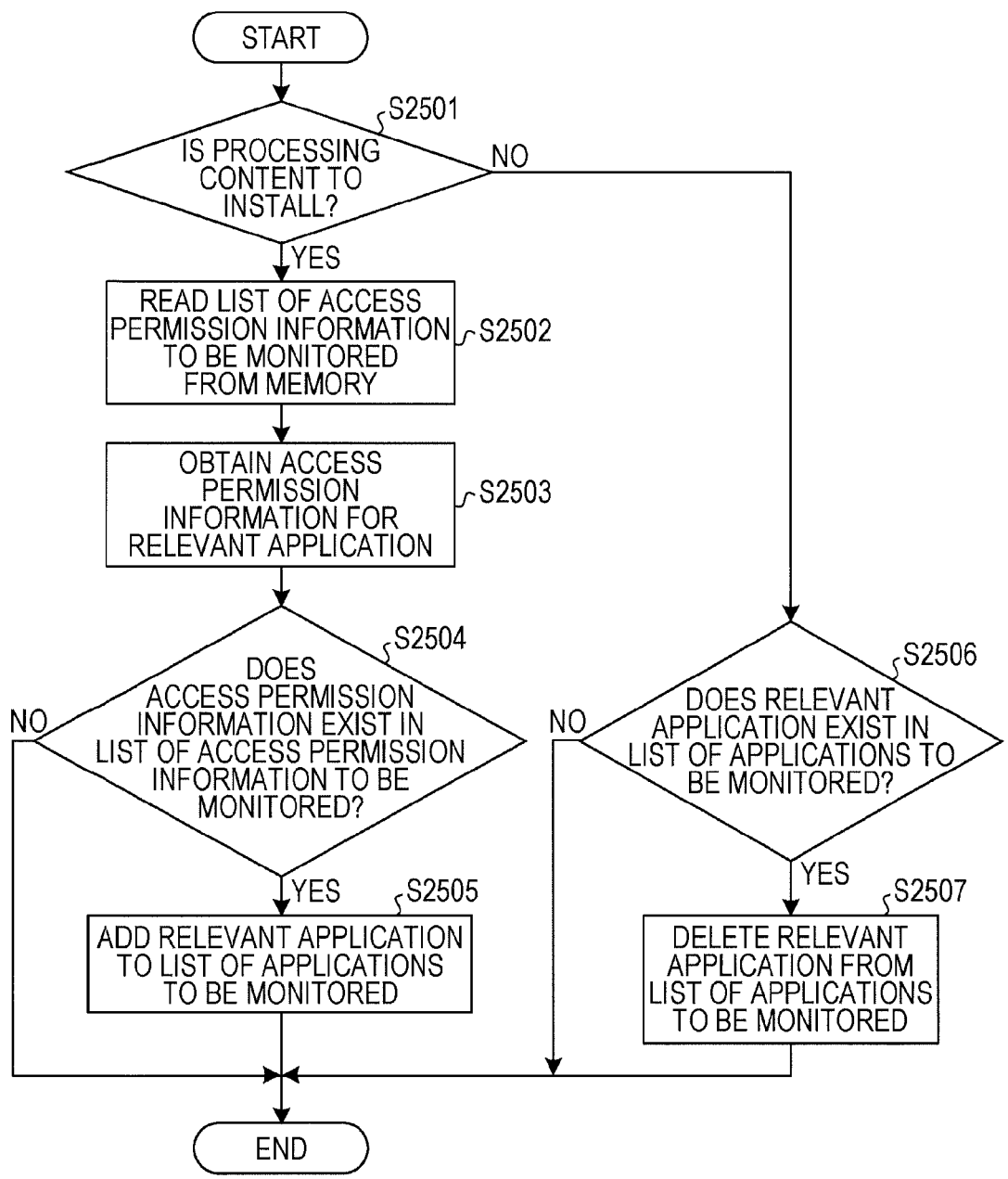
FIG. 25 is a flowchart illustrating an example of processing by an installer.

FIG. 25 is a flowchart illustrating an example of processing by an installer. The installer 2402 executes the S illustrated in FIG. 25 for example, if performing the process of installing or uninstalling applications. First, the installer 2402 determines whether processing content is to install (S2501). If the processing content is to install (yes in S2501), the installer 2402 reads the list of access permission information to be monitored 2401 from memory (for example, auxiliary memory 203) of the information processing device 100 (S2502).

Next, the installer 2402 obtains access permission information of the application to be installed (S2503). The installer 2402 then determines whether or not the access permission information obtained in S2503 is in the list of access permission information to be monitored 2401 read in S2502 (S2504).

In S2504, if the access permission information is not in the list of access permission information to be monitored 2401 (no in S2504), the installer 2402 ends the series of processing. If the access permission information is in the list of access permission information to be monitored 2401 (yes in S2504), the installer 2402 adds the relevant application to the list of applications that are monitoring targets 341 (S2505) and ends the series of processing.

In S2501, if the processing content is uninstall rather than install (no in S2501), the installer 2402 determines whether or not the application to be uninstalled is in the list of applications that are monitoring targets 341 (S2506).

In S2506, if the relevant application is not in the list of applications that are monitoring targets 341 (no in S2506), the installer 2402 ends the series of processing. If the relevant application is in the list of applications that are monitoring targets 341 (yes in S2506), the installer 2402 deletes the relevant application from the list of applications that are monitoring targets 341 (S2507) and ends the series of processing.

By performing the above S, determination may be automatically made regarding whether or not to add an application that is to be installed to the list of applications that are monitoring targets 341 based on the access permission information of the application to be installed. In addition, an application to be uninstalled may be automatically deleted from the list of applications that are monitoring targets 341.

The control policy changing rule table 370 according to the fourth embodiment is, for example, the same as the control policy changing rule table 370 illustrated in FIG. 7.

Thus, with the information processing device 100 according to the fourth embodiment, if the access authority of an application to be installed is a particular access authority, the relevant application may be stored as being a particular application. Accordingly, registration of particular applications may be facilitated, thereby alleviating the load on the user.

In addition, with the information processing device 100, an application to be uninstalled may be excluded from the particular applications. Thus, deletion of particular applications may be facilitated, thereby alleviating the load on the user.

Fifth Embodiment

Figure 26:
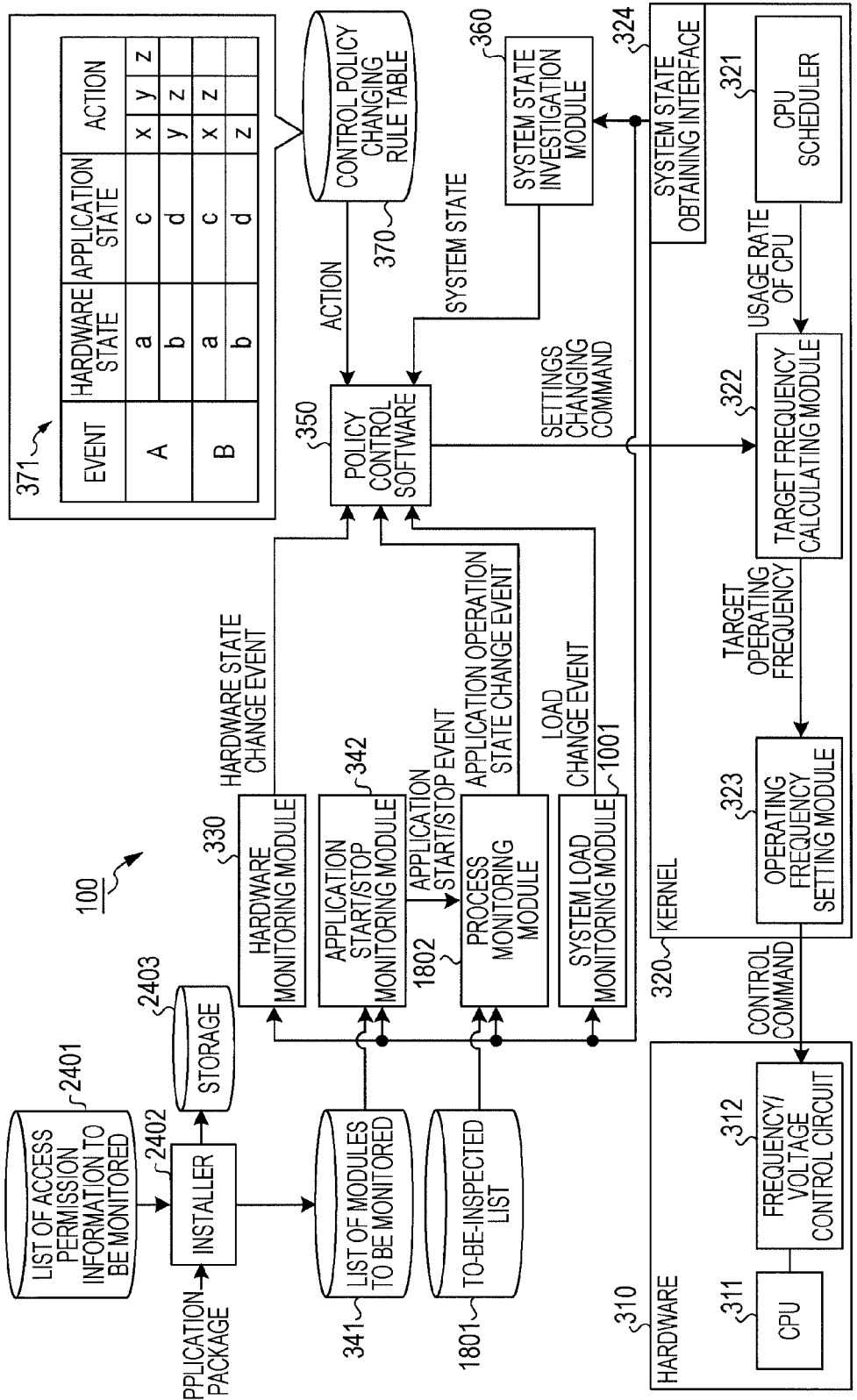
FIG. 26 is a functional block diagram of an information processing device according to a fifth embodiment.

FIG. 26 is a functional block diagram of an information processing device according to a firth embodiment. The portions in FIG. 26 which are the same as those illustrated in FIG. 18 or FIG. 24 are denoted with the same reference numerals, and description thereof is omitted. As illustrated in FIG. 26, the information processing device 100 according to the fourth embodiment has, in addition to the configuration illustrated in FIG. 18, the list of access permission information to be monitored 2401, the installer 2402, and storage 2403.

In this way, a configuration may be made wherein the configuration of the information processing device 100 according to the third embodiment and the configuration of the information processing device 100 according to the fourth embodiment are combined. Accordingly, the control policy for the operating frequency of the list of access permission information to be monitored 2401 may be changed in accordance with the actual usage state of particular applications, while also alleviating the load on the user.

As described above, according to the information processing device, information processing program, and information processing method, the operating frequency of the CPU may be suitably set in accordance with the situation. Thus, for example, power consumption may be reduced while securing software responsiveness.

The information processing method described in the above embodiments may be realized by executing a program prepared beforehand with a computer such as a personal computer or workstation, or the like. This program may be recorded in a computer-readable recording medium such as a hard disk, floppy disk, CD-ROM, magneto-optical (MO) disc, DVD, or the like, and read out from the recording medium by the computer so as to be executed. In addition, the medium may be a transfer medium whereby the program may be distributed via a network, such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a processor; and
a storage coupled to the processor and configured to store correlation information in which control rules for an operating frequency of the processor of the information processing device each of which are correlated with each of combinations of a state change of a first element of the information processing device, and states of a second element of the information processing device which are different from the first element,
wherein the processor is configured to
detect the state change of the first element on the basis of detecting that a state of the first element changed;
determine a state of the second element in case of the detecting that the state of the first element changed, the determined state of the second element being one of the states of the second element;
search for, from the correlation information, a candidate control rule corresponding to a combination of the state change of the first element and the determined state of the second element; and
control the operating frequency on the basis of the candidate control rule,
wherein the state change of the first element includes the state change of hardware in the case of a user ending operating of the information processing device, the state of the second element includes a state of whether or not a particular software executed by the processor is being executed, and in the correlation information, a control rule is correlated with the combination of the state change of hardware in the case of the user ending the operating and the state of the particular software being executed, so that the processing capabilities of the processor are higher than with a case of a control rule being correlated with the combination of the state change of hardware in the case of the user ending the operating and the state of the particular software not being executed, and
wherein the state change of hardware in the case of the user ending the operating includes change of a display of the information processing device going from on to off.

2. The information processing device according to claim 1, wherein the state change of the first element includes stopping supply of external power to the information processing device, the state of the second element includes a state of whether or not a particular software executed by the processor is being executed, and in the correlation information, a control rule is correlated with the combination of the supply stop and the state of the particular software being executed, so that the processing capabilities of the processor are higher than with a case of a control rule being correlated with the combination of the supply stop and the state of the particular software not being executed.

3. The information processing device according to claim 2, wherein the state change of the first element includes starting of a particular software which is executed by the processor, the state of the second element includes a state of whether or not the remaining battery of the information processing device is at or above a threshold value, and in the correlation information, a control rule is correlated with the combination of the starting of particular software and the state of the remaining battery not being at or above a threshold value, so that the power consumption of the processor is lower than with a case of a control rule being correlated with the combination of starting of particular software and the state of the remaining battery not being at or above a threshold value.

4. The information processing device according to claim 3, wherein the state change of the first element includes the state change of hardware in the case of a user starting operating of the information processing device, the state of the second element includes a state of whether or not the remaining battery of the information processing device is at or above a threshold value, and in the correlation information, a control rule is correlated with the combination of the state change of hardware in the case of the user starting the operating and the state of the remaining battery not being at or above a threshold value, so that the power consumption of the processor is lower than with a case of a control rule being correlated with the combination of state change of hardware in the case of the user starting the operating and the state of the remaining battery not being at or above a threshold value.

5. The information processing device according to claim 4, wherein the state change of hardware in the case of the user ending the operating includes change of a display of the information processing device going from off to on.

6. The information processing device according to claim 5, wherein the control rule is information indicating at least one of an algorithm and parameter for the processor to control the operating frequency, and the processor changes at least one of the algorithm and parameter based on the control rule searched by the processor.

7. The information processing device according to claims 6, wherein the state change of the first element includes a load increase in which the load on the processor increases from below a threshold value to or above the threshold value, and the processor increases the upper limit value of the operating frequency in the event that the load increase has been detected by the processor.

8. The information processing device according to claim 7, wherein the processor calculates the load based on a percentage of time at which the processor has operated at an upper limit value of the operating frequency within a predetermined period of time, and wherein the processor detects the load increase based on the percentage calculated by the processor.

9. The information processing device according to claim 8, wherein the state change of the first element includes change in the operating state of the particular software, and the processor detects change in the operating state of the particular software based on usage time of the processor by the particular software.

10. The information processing device according to claim 9, wherein the processor starts detecting processing of the change in operating state upon the particular software starting, and ends detecting processing of the change in operating state upon the particular software stopping.

11. The information processing device according to claim 10, further comprising an installer configured to install an application in the information processing device, wherein the state change of the first element includes starting of a particular software which is executed by the processor, or, the state of the second element includes a state of whether or not the particular software is being executed, and the installer stores an application to be installed as the particular software in the event that access authority of the application to be installed as to the information processing device is a particular access authority.

12. The information processing device according to claim 10, further comprising an uninstaller configured to uninstall an application from the information processing device, wherein the state change of the first element includes starting of a particular software which is executed by the processor, or, the state of the second element includes a state of whether or not the particular software is being executed, and the uninstaller excludes an application to be uninstalled from being the particular software.

13. A non-transitory, computer readable storage medium storing information processing program, which when executed by an information processing device, causes the information processing device to:
   detect a state change of a first element of the information processing device on the basis of detecting that a state of the first element changed;
   determine a state of a second element of the information processing device in case of the detecting that the state of the first element changed;
   search for, from correlation information, a candidate control rule corresponding to a combination of the detected state change of the first element and the determined state of the second element, the correlation information including control rules for an operating frequency of a processor of the information processing device which are correlated with each of combinations of the state change of the first element, and states of the second element; and
   control the operating frequency on the basis of the candidate control rule, wherein the state change of the first element includes the state change of hardware in the case of a user ending operating of the information processing device, the state of the second element includes a state of whether or not a particular software executed by the processor is being executed, and in the correlation information, a control rule is correlated with the combination of the state change of hardware in the case of the user ending the operating and the state of the particular software being executed, so that the processing capabilities of the processor are higher than with a case of a control rule being correlated with the combination of the state change of hardware in the case of the user ending the operating and the state of the particular software not being executed, and wherein the state change of hardware in the case of the user ending the operating includes change of a display of the information processing device going from on to off.

14. A method of controlling an information processing device comprising:
   detecting a state change of a first element of the information processing device on the basis of detecting that a state of the first element changed;
   determining a state of a second element of the information processing device in case of the detecting that the state of the first element changed;
   searching for, from correlation information, a candidate control rule corresponding to a combination of the detected state change of the first element and the determined state of the second element, the correlation information including control rules for an operating frequency of a processor of the information processing device which are correlated with each of combinations of the state change of the first element, and states of the second element; and
   controlling the operating frequency on the basis of the candidate control rule, wherein the state change of the first element includes the state change of hardware in the case of a user ending operating of the information processing device, the state of the second element includes a state of whether or not a particular software executed by the processor is being executed, and in the correlation information, a control rule is correlated with the combination of the state change of hardware in the case of the user ending the operating and the state of the particular software being executed, so that the processing capabilities of the processor are higher than with a case of a control rule being correlated with the combination of the state change of hardware in the case of the user ending the operating and the state of the particular software not being executed, and wherein the state change of hardware in the case of the user ending the operating includes change of a display of the information processing device going from on to off.

* * * * *

UNITED STATES PATENT AND TRADEMARK OFFICE
CERTIFICATE OF CORRECTION

| | | |
|---|---|---|
| PATENT NO. | : 9,003,212 B2 | Page 1 of 1 |
| APPLICATION NO. | : 13/488729 | |
| DATED | : April 7, 2015 | |
| INVENTOR(S) | : Masaaki Noro | |

It is certified that error appears in the above-identified patent and that said Letters Patent is hereby corrected as shown below:

In the Claims

In Column 28, Line 59, In Claim 7, delete "claims" and insert -- claim --, therefor.

Signed and Sealed this
Eighteenth Day of August, 2015

Michelle K. Lee
*Director of the United States Patent and Trademark Office*